(12) United States Patent
Bowland et al.

(10) Patent No.: US 11,827,757 B2
(45) Date of Patent: Nov. 28, 2023

(54) CARBON FIBER-NANOPARTICLE COMPOSITES WITH ELECTROMECHANICAL PROPERTIES

(71) Applicant: UT-Battelle, LLC, Oak Ridge, TN (US)

(72) Inventors: Christopher C. Bowland, Knoxville, TN (US); Amit K. Naskar, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 1083 days.

(21) Appl. No.: 16/280,268

(22) Filed: Feb. 20, 2019

(65) Prior Publication Data

US 2019/0256672 A1  Aug. 22, 2019

Related U.S. Application Data

(60) Provisional application No. 62/632,537, filed on Feb. 20, 2018.

(51) Int. Cl.
*C08J 5/00* (2006.01)
*C08K 7/06* (2006.01)
(Continued)

(52) U.S. Cl.
CPC .............. *C08J 5/005* (2013.01); *C08J 5/041* (2013.01); *C08J 5/042* (2013.01); *C08J 5/06* (2013.01);
(Continued)

(58) Field of Classification Search
CPC ..................................................... C08J 5/005
See application file for complete search history.

(56) References Cited

U.S. PATENT DOCUMENTS 4,070,446 A    1/1978  Horikiri et al.
4,686,096 A *  8/1987  Schulz .................... D01F 9/145
                                                423/447.4
(Continued)

OTHER PUBLICATIONS

Ding W. et al., "Property Analysis of Carbon Fiber with Vinyl Ester Resin Type Sizing Agent", Asian Journal of Chemistry, (2013), vol. 25, No. 14, pp. 7955-7958 http://dx.doi.org/10.14233/ajchem.2013.14807.
(Continued)

*Primary Examiner* — William D Young
(74) *Attorney, Agent, or Firm* — Scully, Scott, Murphy & Presser, P.C.

(57) ABSTRACT

A carbon fiber composite material comprising: (i) a carbon fiber having an outer surface, a thickness of at least 1 micron, and an aspect ratio of at least 1000; (ii) a sizing agent coated on the outer surface of the carbon fiber, wherein the sizing agent has a thickness of up to 200 nm; and (iii) nanoparticles having a size in at least one dimension of up to 100 nm embedded within the sizing agent, wherein the nanoparticles have a metal carbide, metal oxide, metal nitride, and/or metal boride composition. A method for producing the fiber composite material comprises: (a) continuously feeding and coating a continuous carbon fiber with a liquid containing a solvent, sizing agent, and nanoparticles in a continuous feed-through process to result in said sizing agent and nanoparticles coating the surface of the continuous carbon fiber; and (b) removing the solvent from the coated fiber.

19 Claims, 7 Drawing Sheets

(51) Int. Cl.
*C08J 5/04* (2006.01)
*C08J 5/06* (2006.01)
*B82Y 30/00* (2011.01)

(52) U.S. Cl.
CPC .................. *C08K 7/06* (2013.01); *B82Y 30/00* (2013.01); *C08J 2363/02* (2013.01); *C08K 2201/011* (2013.01); *Y10T 428/2927* (2015.01)

(56) References Cited

U.S. PATENT DOCUMENTS

| | | | |
|---|---|---|---|
| 5,298,576 | A | 3/1994 | Sumida et al. |
| 6,013,730 | A | 1/2000 | McGrail et al. |
| 8,221,840 | B2 | 7/2012 | Sugiura et al. |
| 9,528,197 | B2 | 12/2016 | Naskar |
| 9,617,398 | B2 | 4/2017 | Vautard et al. |
| 9,725,829 | B2 | 8/2017 | Naskar et al. |
| 9,732,445 | B2 | 8/2017 | Rios et al. |
| 9,932,703 | B2 | 4/2018 | Hashimoto et al. |
| 2006/0083694 | A1* | 4/2006 | Kodas ................ B01J 13/0095 424/490 |
| 2006/0169041 | A1* | 8/2006 | Madni ................ G01P 15/125 73/504.02 |
| 2008/0020193 | A1 | 1/2008 | Jang et al. |
| 2009/0081441 | A1 | 3/2009 | Shah et al. |
| 2009/0092832 | A1 | 4/2009 | Moireau |
| 2010/0178825 | A1 | 7/2010 | Shah et al. |
| 2010/0279569 | A1 | 11/2010 | Shah et al. |
| 2019/0125028 | A1* | 5/2019 | Bartel ...................... C09D 7/20 |
| 2019/0194482 | A1* | 6/2019 | Yamazaki ............ C01G 23/047 |
| 2020/0224364 | A1* | 7/2020 | Togashi ................. B32B 27/20 |

OTHER PUBLICATIONS

Huang X., "Fabrication and Properties of Carbon Fibers", Materials, (2009), 2, pp. 2369-2403 doi:10.3390/ma2042369.

Ren P. et al., "Influence of Epoxy Sizing of Carbon-Fiber on the Properties of Carbon Fiber/Cyanate Ester Composites", Polymer Composites, (2006), pp. 591-598 DOI 10.1002/pc.

Sun L. et al., "Energy absorption capability of nanocomposites: A review", Composites Science and Technology, (2009), 69, pp. 2392-2409 doi:10.1016/j.compscitech.2009.06.020.

Zhang R.L. et al., "Effect of the Concentration of the Sizing Agent on the Carbon Fibers Surface and Interface Properties of Its Composites", Journal of Applied Polymer Science, (2012), vol. 125, pp. 425-432 DOI 10.1002/app.

\* cited by examiner

2A

2B

CARBON FIBER-NANOPARTICLE COMPOSITES WITH ELECTROMECHANICAL PROPERTIES

CROSS-REFERENCE TO RELATED APPLICATIONS

The present application claims benefit of U.S. Provisional Application No. 62/632,537, filed Feb. 20, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to composites containing carbon fibers and nanoparticles. The present invention is more particularly directed to such composites containing nanoparticles having a piezoresistive or thermoresistive property.

BACKGROUND OF THE INVENTION

Carbon fiber-matrix composites may experience sudden, catastrophic failure when exposed to sufficient stress levels and provide no visual indication of damage before they fail. With the commercial adoption of these high-performance composites in structural applications, a need for in situ monitoring (i.e., structural health monitoring, or SHM) of their structural integrity is critical. Therefore, ways for monitoring these systems has garnered much interest. A common method for accomplishing this is measuring through-thickness resistance changes of the fiber-matrix composite by virtue of the electrically conductive nature of the carbon fibers. This provides information on whole-body stress levels imparted on the composite and can help identify the presence of damage. However, as this technique relies on the carbon fiber and polymer matrix to reveal a resistance change, the damage detection sensitivity is significantly lower than necessary for keeping track of earlier, more subtle precursors to failure. Thus, methods are needed for detecting such precursors to failure with much greater sensitivity.

SUMMARY OF THE INVENTION

In one aspect, the invention is directed to a carbon fiber composite having an enhanced structural health monitoring (SHM) sensitivity along with increased interlaminar strength. As further discussed below, the carbon composite fiber can be produced by a straight-forward synthetic method of integrating semiconducting nanomaterials, such as silicon carbide, into carbon fiber sizing. For the composite fiber to possess SHM ability, the carbon fiber is bonded to nanoparticles possessing a piezoresistive (and/or thermoresistive) property. The piezoresistive effect exhibited by these nanomaterials provides more pronounced resistance changes in response to mechanical stress as compared to carbon fiber alone. The enhanced SHM ability of these composite fibers has herein been confirmed by fabricating a unidirectional composite and subsequently monitoring the electrical resistance during mechanical testing.

More specifically, the carbon fiber composite material contains the following components: (i) a carbon fiber having an outer surface, a thickness of at least 1 micron, and a length-to-width aspect ratio of at least 1000; (ii) a sizing agent coated on the outer surface of the carbon fiber, wherein the sizing agent has a thickness of up to 200 nm; and (iii) nanoparticles having a size in at least one dimension of up to (no more than) 100 nm embedded within the sizing agent, wherein the nanoparticles have a composition selected from either one or a combination of metal carbides, metal oxides, metal nitrides, and metal borides. The nanoparticles have a composition that imparts piezoresistive behavior, or interlaminar strength, or both. In some embodiments, the nanoparticles are semiconductive. In particular embodiments, the carbon fiber is a continuous carbon fiber having a length of at least 1 meter. In other particular embodiments, the nanoparticles have a metal carbide (inclusive of "metalloid carbide") composition, such as a silicon carbide composition. In other particular embodiments, the nanoparticles have a metal oxide composition, such as a transition metal oxide composition, such as titanium oxide, zirconium oxide, yttrium oxide, niobium oxide, zinc oxide, or a perovskite-type composition. The nanoparticles may be present in an amount of, for example, 0.001-20 wt % or 0.001-10 wt % by weight of the carbon fiber composite. In particular embodiments, the sizing agent is an epoxy sizing agent.

In another aspect, the invention is directed to a method of producing the carbon fiber composite described above. The method includes: (a) continuously feeding and coating a continuous carbon fiber with a liquid solution or emulsion containing a solvent, a sizing agent, and nanoparticles having a size of up to 100 nm in a continuous feed-through process to result in the liquid solution or emulsion (i.e., sizing agent and nanoparticles) coating the surface of the continuous carbon fiber, wherein the continuous carbon fiber has an outer surface, a thickness of at least 1 micron, and a length of at least 1 meter, and the nanoparticles have a composition selected from the group consisting of metal carbides, metal oxides, metal nitrides, and metal borides; and (b) removing the solvent from the coating to result in the sizing agent and nanoparticles bonding to the outer surface of the continuous carbon fiber. The end result of the foregoing process is a fiber composite material containing: (i) the continuous carbon fiber, (ii) the sizing agent coated on the outer surface of the carbon fiber, wherein the sizing agent has a thickness of up to 200 nm, and (iii) the nanoparticles embedded within the sizing agent. In some embodiments, the continuous carbon fiber composite produced in step (b) is chopped into segments having a size of 0.1-10 cm.

As further discussed below, this work demonstrates that a high volume, continuous through-put fiber coating process can be used to integrate nanoparticles onto carbon fiber surfaces to create a multifunctional composite. Composites with both increased interlaminar strength and SHM sensitivity are produced from a variety of epoxy and nanoparticle concentrations. By embedding nanoparticles (e.g., silicon carbide) in the fiber sizing, subsequent composite fabrication methods are used to create unidirectional fiber reinforced composites with enhanced structural health monitoring (SHM) sensitivity and increased interlaminar strength. Additional investigations into the mechanical damping behavior of these functional composites reveals a significantly increased loss factor at the glass transition temperature ranging from a 65% to 257% increase. Overall, the best performing composite in terms of combined performance shows an increase of 47.5% in SHM sensitivity and a 7.7% increase in interlaminar strength. This work demonstrates the successful and efficient integration of commercially-manufactured semiconductor nanoparticles into large-scale, structural applications of fiber-reinforced composites having significantly enhanced SHM sensitivity.

BRIEF DESCRIPTION OF THE FIGURES

FIGS. 5A-5C show results for carbon fibers coated with the NP suspension in 1:10 epoxy:water solution. FIGS. 5D-5F show results for carbon fibers coated with the NP suspension in 1:40 epoxy:water solution. More specifically, FIG. 5A shows the full temperature range of the 1:10 solution, along with magnified view at the glass transition temperature (FIG. 5B) and onset of the glass transition temperature (FIG. 5C). Similarly, FIG. 5D shows the full temperature range of the 1:40 solution, along with magnified view at the glass transition temperature (FIG. 5E) and onset of the glass transition temperature (FIG. 5F).

DETAILED DESCRIPTION OF THE INVENTION

Figure 1:
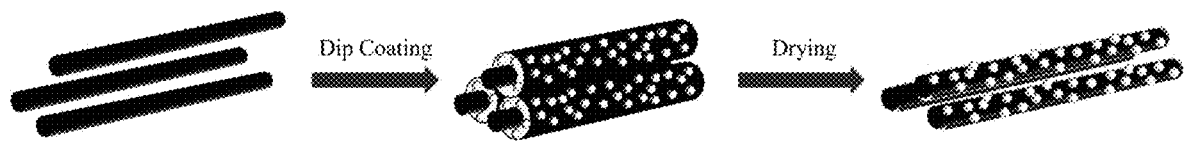
FIG. 1 is a schematic showing an exemplary nanoparticle (NP) coating process. An epoxy or other sizing solution or emulsion is initially diluted with water, and then NPs (e.g., SiC) are added and mixed to get a well-dispersed suspension. Bare carbon fiber tows are then dip coated in the mixture and dried. Notably, the process may be repeated to include a thicker sizing layer containing nanoparticles.

In a first aspect, the invention is directed to a carbon fiber-nanoparticle composite material in which a carbon fiber has a sizing agent bonded to the surface (i.e. outer surface, which defines the contours) of the carbon fiber, along with nanoparticles embedded within the sizing agent. The carbon fiber can be any of the high strength continuous carbon fibers well known in the art. Continuous carbon fibers and methods of producing them are described in detail in, for example, U.S. Pat. Nos. 9,732,445, 9,725,829, 9,528,197, 8,221,840, and 4,070,446, and X. Huang, *Materials (Basel)*, 2(4):2369-2403, December 2009, the entire contents of which are herein incorporated by reference in their entirety. The carbon fiber may also be a chopped version of a continuous fiber. Some examples of carbon fiber compositions include those produced by the pyrolysis of polyacrylonitrile (PAN), viscose, rayon, pitch, lignin, and polyolefin fiber precursors. As well known in the art, the carbon fiber is generally produced by a process in which a carbon fiber precursor (such as any of those mentioned above) is subjected to a stabilization step before a carbonization step. The carbon fiber considered herein generally possesses a high tensile strength, such as at least 500, 1000, 2000, 3000, 5000, 8,000, or 10,000, with a degree of stiffness generally of the order of steel or higher (e.g., 100-1000 GPa). The term "carbon fiber," as used herein, also includes carbon tapes, as well known in the art. The carbon fiber is made predominantly (e.g., at least 90, 95, 98, 99 or 100%) of elemental carbon, but minor amounts of some non-carbon species (e.g., nitrogen, phosphorus, boron, or silicon) may be present, generally in amounts up to or less than 10, 5, 2, or 1 wt %.

As known in the art, the carbon fiber has its length dimension longer than its width dimension. The ratio of the length to the width is commonly referred to as the "aspect ratio" of the carbon fiber. The carbon fiber typically has an aspect ratio of at least or greater than 1000. In some embodiments, the aspect ratio may be, for example, at least or greater than 2,000, 5,000, or 10,000. In some embodiments, the carbon fiber is termed "continuous," which generally corresponds to a length of a least 1 meter. As well known in the art, the continuous carbon fiber is produced in a continuous processing operation in which the precursor fiber and resulting carbon fiber are held in reels (or creels), with long lengths (e.g., tens or hundreds of meters, or kilometers) of the fiber coiled (i.e., wound) within the reels. The continuous carbon fiber, after being coated and processed according to the present invention, may also be chopped. Typically, the continuous carbon fiber is chopped into pieces having a length of at least or greater than 0.1 cm (1 mm). Thus, the chopped carbon fiber typically has a length of at least 0.1 cm and less than 1 meter, such as a length of about, at least, or more than, for example, 0.1, 0.2, 0.5, 1, 2, 5, or 10 cm, or a length within a range bounded by any two of the foregoing values. In some embodiments, the chopped segments of carbon fiber also possess an aspect ratio of at least 1000, while in other embodiments, the chopped segments of carbon fiber are not as restricted in the aspect ratio, e.g., an aspect ratio of at least or greater than 5, 10, 20, 50, 100, 200, or 500 (or range therein). Chopped segments of the foregoing lower aspect ratio may result from fine chopping (e.g., 0.1-1 cm segments) of a continuous carbon fiber having an appreciable width (e.g., 50, 100, or 200 microns). Notably, a continuous fiber may also be defined as a fiber that extends an entire length of a fiber-matrix composite while a chopped fiber may also be defined as fibers that do not extend an entire length of a fiber-matrix composite.

An individual strand or filament of the carbon fiber generally possesses a thickness of at least or greater than 1 micron. Since the aspect ratio of the carbon fiber is typically at least 1000, the minimum thickness of 1 micron also sets a minimum length of at least 1000 microns (i.e., 1 mm, or 0.1 cm). In different embodiments, the individual filament possesses a thickness of at least or greater than 1, 2, 5, 10, 20, 30, 40, 50, or 100 microns. A tow of carbon fiber includes a multiplicity (typically, several thousand) of individual carbon filaments and typically has a thickness of at least 10, 50, or 100 microns and up to, for example, 100, 500, or 1000 microns. Notably, the macroscopic length and width dimensions provided above for the carbon fiber do not correspond with the lengths or widths typical of nanoscopic carbon fibers or carbon particles, such as carbon nanotubes. Thus, for purposes of the present invention, the term "carbon fiber" excludes the known nanoscopic carbon fibers and particles, such as carbon nanotubes and the like.

The carbon fiber contains a sizing agent coated on its outer surface. The sizing agent can be any of the sizing agents well known in the art. Generally, a sizing agent is a polymeric material included on a carbon fiber to facilitate ease of handling, protect the fiber surface during handling, and increase the interfacial strength between the fiber and a polymeric matrix in which the carbon fiber is incorporated. The sizing agent typically has a thickness of up to or less than 200 nm. In different embodiments, the sizing agent has a thickness of up to or less than 200, 150, 100, 75, 50, 40, 30, 20, 10, or 5 nm, or a thickness within a range bounded by any two of the foregoing values. Carbon fiber sizing agents are described in detail in, for example, R. Zhang et al., *Journal of Applied Polymer Science,* 125(1), July 2012 and U.S. Pat. No. 9,932,703, the contents of which are herein incorporated by reference. The sizing agent may be, for example, an epoxy, polyester, or polyurethane resin, and typically an aromatic-containing resin. Epoxy sizing agents, in particular, are described in, for example, P. Ren et al., *Polymer Composites,* 27(5), 591-598, October 2006, U.S. Pat. Nos. 9,617,398, and 5,298,576, the contents of which are herein incorporated by reference. Amine-containing sizing agents are also described in U.S. Pat. No. 9,617,398. Vinyl ester resin emulsion type sizing agents are described in, for example, W. Ding et al., *Asian Journal of Chemistry,* 25(14), 7955-7958, 2013, the contents of which are herein incorporated by reference.

In particular embodiments, the sizing agent is an epoxy sizing agent (i.e., contains epoxy groups). Typically, the epoxy sizing agent is a resin (polymer) possessing at least two epoxide groups, and thus, can be a difunctional, trifunctional, tetrafunctional, or a higher functional epoxy resin. In some embodiments, the epoxide group is present as a glycidyl group. The epoxy resin can be conveniently expressed by the following generic structure:

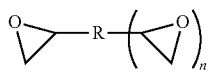

(1)

In Formula (1), n is precisely or at least 1, 2, 3, 4, 5, 6, or any suitable number, including a higher number (e.g., 10, 20, 30, 40, or 50) typical for a polymer having epoxide-containing units. The group R is a saturated or unsaturated hydrocarbon linking group having at least one and up to any suitable number of carbon atoms. In different embodiments, R can have precisely or at least, for example, 1, 2, 3, 4, 5, 6, 7, 8, 9, 10, 12, 15, 18, 20, 25, 30, 35, 40, or 50 carbon atoms, or a number of carbon atoms within a range bounded by any two of these values. The saturated hydrocarbon group suitable as R may be or include, for example, a straight-chained or branched alkylene group or cycloalkylene group. Some examples of saturated R linkers include methylene (i.e., —CH$_2$—), ethylene (i.e., —CH$_2$CH$_2$—), n-propylene (i.e., —CH$_2$CH$_2$CH$_2$—, or "trimethylene"), isopropylene (—CH(CH$_3$)CH$_2$—), tetramethylene, pentamethylene, hexamethylene, —C(CH$_3$)$_2$CH$_2$—, —CH(CH$_3$)CH(CH$_3$)—, —CH$_2$C(CH$_3$)$_2$CH$_2$—, cyclopropylene (i.e., cyclopropy-1diyl), 1,3-cyclobutylene, 1,2-cyclopentylene, 1,3-cyclopentylene, 1,2-cyclohexylene, 1,3-cyclohexylene, and 1,4-cyclohexylene. Some examples of unsaturated R linkers include straight-chained or branched alkenylene or alkynylene groups or cycloalkenylene groups, such as vinylene (—CH=CH—), allylene (—CH$_2$—CH=CH—), —CH$_2$—CH$_2$—CH=CH—, —CH$_2$—CH=CH—CH$_2$—, —CH=CH—CH=CH—, ethynyl, ethynyl-containing hydrocarbon groups, 1,3-cyclopentenediyl, 1,4-cyclohexenediyl, as well as aromatic linking groups, such as 1,2-, 1,3-phenylene, 1,4-phenylene, 4,4'-biphenylene, naphthalen-1,5-diyl, and bisphenol A ether groups. The foregoing exemplary linking groups for R are suitable for linking two epoxide groups. However, a generic set of trifunctional, tetrafunctional, and higher functional epoxy resins are also considered herein wherein one, two, or a higher number of hydrogen atoms from any of the exemplified linking groups provided above for R are replaced by one, two, or a higher number of epoxide groups, respectively (e.g., 1,3,5-triglycidylbenzene). Any two, three, or more linking groups identified above can be linked together as well, such as two methylene groups on a phenylene group, i.e., —CH$_2$—C$_6$H$_4$—CH$_2$—.

In some embodiments, the R linking group contains only carbon and hydrogen atoms. In other embodiments, the R linking groups also includes one, two, three, or more heteroatoms or heteroatom groups. The heteroatoms are typically one or more selected from oxygen (O), nitrogen (N), sulfur (S), or a halogen, such as, for example, fluorine, chlorine, bromine, and iodine atoms. Heteroatoms can be included as, for example, ether (—O—), amino (—NH—, —N=, or as a tertiary amine group), or thioether. Some heteroatom groups include hydroxy (OH), carbonyl (—C(=O)—), organoester (—C(=O)O—), amide (—C(=O)NH—), urea, carbamate, and the like. The heteroatom or heteroatom-containing group can either insert between two carbon atoms engaged in a bond, or between carbon and hydrogen atoms engaged in a bond, or replace a carbon or hydrogen atom. A particular example of a linking group R containing two oxygen atoms is bisphenol A, which is typically di-etherified with glycidyl groups.

In particular embodiments, the epoxy sizing agent is a glycidyl derivative, which can be conveniently expressed as a sub-generic formula of Formula (1) above by the following structural formula:

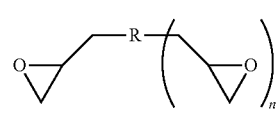

(1a)

The glycidyl derivative can be any of those compounds containing glycidyl groups, typically produced by reacting epichlorohydrin with a polyhydric molecule, such as a dihydric, trihydric, or tetrahydric molecule. The polyhydric molecule can be, for example, a polyhydric alcohol, i.e., polyol (e.g., diol, triol, or tetrol, or generically defined as R—(OH)$_n$ where n is as above except that it is a minimum of 2), polyamine (e.g., diamine, triamine, or tetramine), or polycarboxylic acid (e.g., malonic, succinic, glutaric, adipic, or terephthalic acids). The linking group may also be a hydroxy-containing polymeric structure resulting from ring-opening polymerization of epoxy groups.

Some particular examples of difunctional epoxy sizing agents include diglycidyl ethers of a diol (i.e., glycol), wherein some examples of diols include ethylene glycol, diethylene glycol, triethylene glycol, propylene glycol, 1,3-propanediol, 1,4-butanediol, 1,5-pentanediol, 1,6-hexanediol, tetraethylene glycol, pentaethylene glycol, bisphenol A, bisphenol AF, bisphenol S, neopentyl glycol, 2,2,4,4-tetramethyl-1,3-cyclobutanediol, catechol, resorcinol, dihydroxyquinone, thiodiglycol, and 4,4'-dihydroxybiphenyl. In some embodiments, the epoxy sizing agent is an epoxy prepolymer resin of the following general formula (Formula 2) (where m can be 0, 1, 2, 3, 4, 5, 10, or a number up to, for example, 20, 25, 30, 40, or 50 or a number within a range bounded by any two of these values):

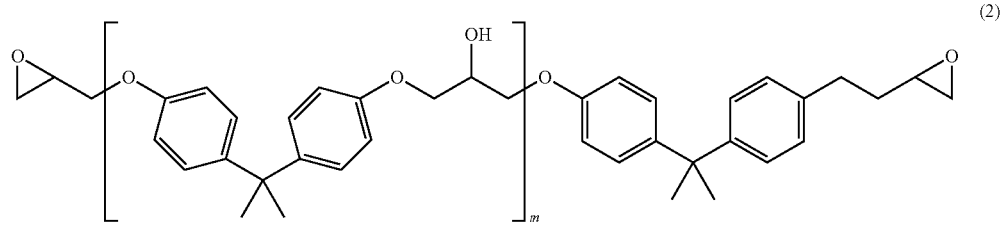

(2)

Some particular examples of trifunctional and tetrafunctional epoxy resins include triglycidyl and tetraglycidyl ethers of a triol or tetrol, respectively, wherein some examples of triols include glycerol, 1,3,5-trihydroxybenzene (phloroglucinol), trimethylolethane, trimethylolpropane, triethanolamine, and 1,3,5-triazine-2,4,6-triol (cyanuric acid). An example of a tetrol is pentaerythritol.

The difunctional, trifunctional, tetrafunctional, or higher functional epoxy resin can also be, for example, a diglycidyl, triglycidyl, tetraglycidyl, or higher polyglycidyl ether of a phenol novolak resin or bisphenol A novolak resin. Such resins are well known in the art, as described, for example, in U.S. Pat. No. 6,013,730, which is herein incorporated by reference in its entirety.

In some embodiments, the sizing agent is partially or fully cured with a difunctional or higher functional molecule capable of crosslinking reactive (e.g., epoxy, amine, or vinyl) groups on the sizing agent. In the case of an epoxy sizing agent, the curing agent includes epoxy-reactive groups, such as, for example, hydroxy (e.g., alcohol or phenol), carboxylic acid, thiol, amine, or amide groups. Typically, the curing agent is a polyamine, such as a diamine, triamine, tetramine, or higher polyamine, such as an amine-containing polymer, wherein it is understood that the polyamine contains at least two amino groups selected from primary, secondary, and tertiary amines. The polyamine can be conveniently expressed as $R-(NH_2)_n$, wherein R and n are as defined above in Formula (1). In some cases, one or two hydrogen atoms of the amino group may be replaced with a linker R or a hydrocarbon group (a protonated form of any of the linking groups R), which may itself also contain a primary, secondary, or tertiary amine group. Some examples of polyamine curing agents include ethylene diamine (EDA), diethylenetriamine (DETA), triethylenetetramine (TETA), tetraethylenepentamine (TEPA), piperazine, guanidine, 2-cyanoguanidine (dicyandiamide), aromatic amines (e.g., diaminobenzene, methylenedianiline, and 3,3'- and 4,4'-diaminodiphenylsulfones), polyethylene glycol-based polyamines (e.g., triethylene glycol diamine or tetraethylene glycol diamine, or as provided by the commercially available polyetheramine JEFFAMINE® series of compositions), m-phenylenediamine, imidazole, 2-methylimidazole, diethylaminopropylamine, isophoronediamine, m-xylenediamine, as well as their N-alkyl (e.g., N-methyl or N-ethyl) analogs, provided that at least two amino groups selected from primary and secondary amines are provided in the curing agent.

In the carbon fiber composite material, nanoparticles having a size of up to or less than 100 nm, in at least one or two size dimensions of the nanoparticles, are embedded within the sizing agent. In one set of embodiments, one size dimension of the nanoparticles is about, up to, or less than 1, 2, 5, 10, 20, 50, or 100 nm (or within a range therein) while the remaining two size dimensions are above 100 nm, e.g., independently up to or less than 200 nm, 500 nm, 1 micron, 2 microns, 5 microns, or 10 microns, in which case the nanoparticles would have a plate-like or fiber-like morphology depending on the size difference between the remaining two dimensions. In another set of embodiments, two size dimensions of the nanoparticles are independently about, up to, or less than 1, 2, 5, 10, 20, 50, or 100 nm (and may be the same or different) while the remaining size dimension is above 100 nm, e.g., independently up to or less than 200 nm, 500 nm, 1 micron, 2 microns, 5 microns, or 10 microns, in which case the nanoparticles would generally have a fiber-like morphology. In more particular embodiments, the nanoparticles are fibers (i.e., filaments) having an aspect ratio of at least 50, 100, 500, or 1000 (e.g., width of 5, 10, 20, 50, or 100 nm and length of at least 1, 2, 5, or 10 microns). In another set of embodiments, all three size dimensions of the nanoparticles are independently about, up to, or less than, for example, 1, 2, 5, 10, 20, 50, or 100 nm (or independently within a range therein), wherein the three size dimensions may be the same (e.g., spherical or polyhedral) or different (e.g., ovoid, plate-like, fiber-like, or polyhedral).

The nanoparticles have a composition selected from metal carbides, metal oxides, metal nitrides, and metal borides. The term "metal," as used herein, includes traditionally defined metals as well as metalloids (those elements having both metallic and non-metallic properties and which overlap with the main group elements). In some embodiments, the metal nanoparticles impart a piezoresistive (or thermoresistive) property to the fiber composite material. In other embodiments, the metal nanoparticles impart greater interlaminar strength (or interlaminar shear strength) to the fiber composite material when the fiber composite material is incorporated into a polymeric matrix. Typically, nanoparticles that provide a piezoresistive (or thermoresistive) property also impart an enhanced interlaminar strength property. However, nanoparticles that impart an interlaminar strength property may not impart a piezoresistive (or thermoresistive) property. For purposes of the invention, the nanoparticles are not composed of a single element, such as carbon. Thus, the nanoparticles are not carbon nanoparticles, such as carbon nanotubes and the like. Nevertheless, the carbon fiber composite material described herein may or may not include carbon nanoparticles, provided that at least a portion (i.e., preferably at least 20, 50, 70, or 90 wt %) of the nanoparticles are metal carbide, metal oxide, metal nitride, and/or metal boride in composition (by total weight of the nanoparticles).

In a first set of embodiments, the nanoparticles have a metal carbide composition. The metal carbide nanoparticles may function to impart a piezoresistive (or thermoresistive) property and/or greater interlaminar strength. The metal carbide composition can be (or include), for example, silicon carbide, tungsten carbide, molybdenum carbide, iron carbide, titanium carbide, or boron carbide. Many metal carbide nanoparticles are well known in the art and commercially available. Silicon carbide and titanium carbide nanoparticles are described in, for example, A. Mahawish et al., *J Civil Environ Eng* 7:277, 2017 (doi: 10.4172/2165-784X.1000277); Baiq et al., *J. Photochem. Photobiol. B.*, 187:113-119, October 2018; F. Chen et al., *Biomaterials*, 179:60-70, October 2018; D. Beke et al., *Langmuir*, 33(50): 14263-14268, December 2017; and H. Kwon et al., *Nanotechnology*, 23(22):225704, June 2012, the contents of which are herein incorporated by reference in their entirety. Tungsten carbide nanoparticles are described in, for example, L. Wang et al., *ACS Appl. Mater. Interfaces*, 10(48), 41338-41343, 2018, the contents of which are herein incorporated by reference in their entirety. Aluminum carbide and aluminum-magnesium-carbide nanoparticles are described in, for example, K. M. Tibbetts et al., *Nano-Structures & Nano-Objects*, vol. 6, pp. 1-4, April 2016, the contents of which are herein incorporated by reference in their entirety. Molybdenum carbide nanoparticles are described in, for example, Y Xu et al., *Nanoscale*, 10(46): 21944-21950, November 2018, the contents of which are herein incorporated by reference in their entirety. Iron carbide nanoparticles are described in, for example, A. Bordet et al., *Angew. Chem. Int. Fd. Fngl.*, 55(51):15894-15898, December 2016, the contents of which are herein incorporated by reference in their entirety. Titanium carbide nanoparticles are described in, for example, J. Laloy et al., *Toxicol. Rep.*, 1:172-187, May 2012, the contents of which are herein incorporated by reference in their entirety. Boron carbide nanoparticles are described in, for example, H. Turkez et al., *Chem. Biol. Interact.*, 300:131-137, February 2019, the contents of which are herein incorporated by reference in their entirety. In some embodiments, any one or more of any of the metal carbide compositions described above are excluded.

In a second set of embodiments, the nanoparticles have a metal oxide composition. The metal oxide nanoparticles may function to impart a piezoresistive (or thermoresistive) property and/or greater interlaminar strength. Metal oxide nanoparticles are among the most well known in the art and are widely available. The metal oxide composition can be (or include), for example, an alkali oxide, alkaline earth oxide, transition metal oxide, main group oxide, or lanthanide metal oxide. Some examples of alkali metal oxides include lithium oxide ($Li_2O$), sodium oxide ($Na_2O$), potassium oxide ($K_2O$), and rubidium oxide ($Rb_2O$). Some examples of alkaline earth metal oxides include beryllium oxide (BeO), magnesium oxide (MgO), calcium oxide (CaO), strontium oxide (SrO), and barium oxide (BaO). The transition metal oxide can be an oxide of a first row transition metal (i.e., elements of atomic number 21-30), a second row transition metal (i.e., elements of atomic number 39-48), or a third row transition metal (i.e., elements of atomic number 72-80. Some examples of transition metal oxides include the scandium oxides (e.g., $Sc_2O_3$, or scandia), yttrium oxides (e.g., yttria, or $Y_2O_3$, and yttria-containing materials), titanium oxides (e.g., $TiO_2$ and $Ti_2O_3$), zirconium oxides (e.g., $ZrO_2$ or zirconia), hafnium oxides ($HfO_2$), vanadium oxides (e.g., $V_2O_5$, $VO_2$, and $V_2O_3$), niobium oxides (e.g., NbO, $NbO_2$, and $Nb_2O_5$), tantalum oxides (e.g., $Ta_2O_5$), chromium oxides (e.g., $Cr_2O_3$ and $CrO_2$), molybdenum oxides (e.g., $MoO_3$ and $MoO_2$), tungsten oxides (e.g., $W_2O_3$, $WO_2$, and $WO_3$), manganese oxides (e.g., MnO, $Mn_3O_4$, $Mn_2O_3$, and $MnO_2$), rhenium oxides (e.g., $ReO_2$, $ReO_3$, and $Re_2O_7$), iron oxides (e.g., $Fe_2O_3$, FeO, and $Fe_3O_4$), ruthenium oxides (e.g., $RuO_2$), cobalt oxides (e.g., CoO and $Co_3O_4$), rhodium oxide, iridium oxide, nickel oxides (e.g., NiO), palladium oxide, platinum oxide, copper oxides ($Cu_2O$ and CuO), silver oxide ($Ag_2O$), zinc oxide (ZnO), and cadmium oxide (CdO). Some examples of main group metal oxides include the boron oxides (e.g., $B_2O_3$), aluminum oxides (e.g., $Al_2O_3$ and its different forms), gallium oxides (e.g., $Ga_2O_3$), indium oxides (e.g., $In_2O_3$, and indium tin oxide, i.e., ITO), silicon oxides (e.g., $SiO_2$ and its different forms), germanium oxides (e.g., $GeO_2$), tin oxides (e.g., $SnO_2$ and SnO), lead oxides (e.g., $PbO_2$ and PbO), phosphorus oxides (e.g., $P_2O_5$), arsenic oxides (e.g., $As_2O_3$), antimony oxides (e.g., $SbO_2$ or $Sb_2O_4$), and bismuth oxides (e.g., $Bi_2O_3$). The lanthanide metal oxide can be an oxide of a lanthanide metal selected from, for example, any of the elements having an atomic number of 57-71. The lanthanide oxides generally have the formula $(Ln)_2O_3$, wherein Ln represents one or a combination of lanthanide metals, such as those selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). In some embodiments, the metal oxide nanoparticle has an aerogel morphology, as well known in the art. In some embodiments, any one or more of any of the metal oxide compositions described above are excluded.

In some embodiments, the metal oxide nanoparticles have a perovskite structure of the formula:

$$M'M''O_3 \qquad (3)$$

In Formula (3) above, M' and M'' are typically different metal cations, thereby being further exemplary of mixed-metal oxide compositions. The metal cations can be independently selected from, for example, the first, second, and third row transition metals, lanthanide metals, and main group metals. More typically, M' represents a trivalent metal (often from Group IIIB) and M'' represents a transition metal, and more typically, a first row transition metal. Some examples of perovskite oxides include $LaCrO_3$, $LaMnO_3$, $LaFeO_3$, $YCiO_3$, and $YMnO_3$.

M' and M'' in Formula (3) may also be the same metal, wherein Formula (3) reduces to $M'_2O_3$. In these compositions, M' is typically a first row transition metal. Some examples of such compositions include $Cr_2O_3$, and $Fe_2O_3$, both having the corundum crystal structure, and $Mn_2O_3$, having the bixbyite crystal structure.

In other embodiments, the metal oxide nanoparticles have a spinel structure of the formula:

$$M_x'M''_{3-x}O_4 \qquad (4)$$

In Formula (4) above, M' and M'' are the same or different metal cations. Typically, at least one of M' and M'' is a transition metal cation, and more typically, a first-row transition metal cation. In order to maintain charge neutrality with the four oxide atoms, the oxidation states of M' and M'' sum to +8. Generally, two-thirds of the metal ions are in the +3 state while one-third of the metal ions are in the +2 state. The +3 metal ions generally occupy an equal number of tetrahedral and octahedral sites, whereas the +2 metal ions generally occupy half of the octahedral sites. However, Formula (4) includes other chemically-acceptable possibilities, including that the +3 metal ions or +2 metal ions occupy only octahedral or tetrahedral sites, or occupy one type of site more than another type of site. The subscript x can be any numerical (integral or non-integral) positive value, typically at least 0.01 and up to 1.5.

Some examples of spinel oxide compositions having two metals include those of the general composition $M'_yFe_{3-y}O_4$; the general composition $M'_yCo_{3-y}O_4$; and the general composition $M'_yNi_{3-y}O_4$, wherein y in the general compositions given above represents an integral or non-integral numerical value of at least 0.1 and up to 2; and M' represents one or a combination of metal ions, e.g., $(M'_a,M''_b)_yFe_{3-y}O_4$, wherein subscripts a and b are non-integral numbers that sum to 1 (e.g., $Mn_{0.5}Zn_{0.5}Fe_2O_4$, $Mn_{0.4}Zn_{0.6}Fe_2O_4$, $Ni_{0.5}Co_{0.5}Fe_2O_4$, and $Ni_{0.4}Co_{0.6}Fe_2O_4$).

When M' and M" in Formula (4) are the same, Formula (4) becomes simplified to the general formula:

$$M_3O_4 \quad (4a)$$

Some examples of compositions according to Formula (4a) include $Fe_3O_4$ (magnetite), $Co_3O_4$, and $Mn_3O_4$.

In particular embodiments of Formula (4), the spinel structure has the composition:

$$M'M''_2O_4 \quad (4b)$$

In Formula (4b) above, M" is typically a trivalent metal ion and M' is typically a divalent metal ion. More typically, M' and M" independently represent transition metals, and more typically, first row transition metals. Some examples of spinel compositions include $NiCr_2O_4$, $CuCr_2O_4$, $ZnCr_2O_4$, $CdCr_2O_4$, $MnCr_2O_4$, $NiMn_2O_4$, $CuMn_2O_4$, $ZnMn_2O_4$, $CdMn_2O_4$, $NiCo_2O_4$, $CuCo_2O_4$, $ZnCo_2O_4$, $CdCo_2O_4$, $MnCo_2O_4$, $NiFe_2O_4$, $CuFe_2O_4$, $ZnFe_2O_4$, $CdFe_2O_4$, and $MnFe_2O_4$. M' and M" can also be combinations of metals, such as in $(Co,Zn)Cr_2O_4$, and $Ni(Cr, Fe)_2O_4$.

In a third set of embodiments, the nanoparticles have a metal nitride composition. The metal nitride nanoparticles may function to impart a piezoresistive (or thermoresistive) property and/or greater interlaminar strength. The metal nitride composition can be (or include), for example, an alkaline earth nitride, transition metal nitride, main group nitride, or lanthanide metal nitride. Any of the metal elements provided above for metal oxide compositions are considered herein for metal nitride compositions. For example, the metal nitride composition can be (or include), silicon nitride, gallium nitride, indium nitride, titanium nitride, boron nitride, magnesium nitride, tungsten nitride, molybdenum nitride, or iron nitride. Many metal nitride nanoparticles are well known in the art and commercially available. Silicon nitride, silicon oxynitride, and silicon carbide nitride nanoparticles are described in, for example, Y. Q. Wang et al., *Appl. Phys. Lett.*, 83, 3474, 2003; K. Matsumoto et al., *Journal of Polymer Science Part A: Polymer Chemistry*, 44(15), 4696-4707, August 2006; D. H. Ma et al., *Ceramics International*, 44(2), 1443-1447, February 2018; and J. Grabis et al., *Solid State Phenomena*, vol 94, 151-156, 2003, the contents of which are herein incorporated by reference in their entirety. Titanium nitride nanoparticles are described in, for example, V. I. Zakomimyi et al., *Photonics and Nanostructures—Fundamentals and Applications*, vol. 30, 50-56, July 2018, the contents of which are herein incorporated by reference in their entirety. Magnesium nitride, titanium nitride, zirconium nitride, and hafnium nitride nanoparticles are described in, for example, R. A. Karaballi et al., *Angew. Chem. Int. Ed. Engl.*, January 2019, DOI: 10.1002/anie.201813134, the contents of which are herein incorporated by reference in their entirety. Boron nitride nanoparticles are described in, for example, V. Salles et al., *Journal of the European Ceramic Society*, 32(9), 1867-1871, July 2012, the contents of which are herein incorporated by reference in their entirety. Molybdenum nitride and tungsten nitride nanoparticles are described in, for example, C. L. Dezelah I V, et al., *Journal of Materials Chemistry*, 14, 3167-3176, 2004, the contents of which are herein incorporated by reference in their entirety. Iron nitride nanoparticles are described in, for example, C. Schliehe et al., *Chem. Mater.*, 24(14), 2716-2721, 2012, the contents of which are herein incorporated by reference in their entirety. Gallium nitride nanoparticles are described in, for example, A. Cruz-Lopez et al., *Materials Science in Semiconductor Processing*, vol. 30, pp. 435-441, February 2015, the contents of which are herein incorporated by reference in their entirety. In some embodiments, any one or more of any of the metal nitride compositions described above are excluded.

In a fourth set of embodiments, the nanoparticles have a metal boride composition. The metal boride nanoparticles may function to impart a piezoresistive (or thermoresistive) property and/or greater interlaminar strength. The metal boride composition can be (or include), for example, an alkaline earth boride, transition metal boride, main group boride, or lanthanide metal boride. Any of the metal elements provided above for metal oxide compositions are considered herein for metal boride compositions. For example, the metal boride composition can be (or include), silicon boride, titanium boride, cobalt boride, nickel boride, niobium boride, tungsten boride, molybdenum boride, iron boride, or magnesium boride. Many metal boride nanoparticles are well known in the art and commercially available. Cobalt boride nanoparticles are described in, for example, S. Choi et al., *Advanced Powder Technology*, 25(1), 365-371, January 2014, the contents of which are herein incorporated by reference in their entirety. Nickel boride nanoparticles are described in, for example, J. Legrand et al., *Langmuir*, 18(10), 4131-4137, 2002, the contents of which are herein incorporated by reference in their entirety. Iron boride nanoparticles are described in, for example, M. Asif Hamayun et al., *Journal of Magnetism and Magnetic Materials*, 451, 407-413, April 2018, the contents of which are herein incorporated by reference in their entirety. Titanium boride nanoparticles are described in, for example, K. A. Efimova et al., 91, *IOP Conf. Ser.: Mater. Sci. Eng.*, 2015 (doi: 10.1088/1757-899X/91/1/012002), the contents of which are herein incorporated by reference in their entirety. Niobium boride nanoparticles are described in, for example, O. Balci et al., *Transactions of Nonferrous Metals Society of China*, 26(3), 747-758, March 2016, the contents of which are herein incorporated by reference in their entirety. Magnesium boride nanoparticles are described in, for example, O. I. Lomovsky et al., *Inorganic Materials*, 46(1), 22-27, January 2010, the contents of which are herein incorporated by reference in their entirety. In some embodiments, any one or more of any of the metal boride compositions described above are excluded.

The nanoparticles are preferably present in an amount of at least 0.001, 0.005, or 0.01 wt % and up to 10, 20, or 30 wt % by weight of the carbon fiber-nanoparticle composite. In different embodiments, the nanoparticles are present in the carbon fiber-nanoparticle composite in an amount of about or at least, for example, 0.001, 0.005, 0.01, 0.05, 0.1, 0.2, 0.5, 1, 2, 5, 10, 12, 15, 18, 20, 25, or 30 wt %, or an amount within a range bounded by any two of the foregoing values (e.g., 0.01-20 wt % or 0.01-10 wt %).

In another aspect, the present invention is directed to a method for producing the above-described carbon fiber composite material. In the method, a continuous carbon fiber is continuously fed (i.e., by a continuous feed-through process) into a coating zone in which the carbon fiber is coated with a liquid solution or emulsion that contains a solvent, the sizing agent, and nanoparticles described above. Typically, the carbon fiber is coated by dip coating the carbon fiber into the solution or emulsion. However, other means of coating the carbon fiber are possible, such as spray coating or brush coating the solution or emulsion onto the carbon fiber. Electrospraying may or may not also be used. In some embodiments, the solvent is a polar organic solvent, which may be protic or aprotic. The solvent generally has a melting point up to or less than 50, 40, 30, 25, 20, 10, or 0° C. Some examples of polar protic solvents include water, the alcohols (e.g., methanol, ethanol, isopropanol, n-butanol, t-butanol, the pentanols, hexanols, octanols, or the like), and diols (e.g., ethylene glycol, diethylene glycol, triethylene glycol). The solvent typically is or includes water in many aqueous sizing formulations. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1-trichloroethane), ketones (e.g., acetone, 2-butanone), and dialkylcarbonates (e.g., ethylene carbonate, dimethylcarbonate, diethylcarbonate). The solvent may also be a mixture of two or more solvents, such as any of the solvents provided above. In some embodiments, to facilitate subsequent drying, a solvent or solvent system is employed in which the solvent or solvent system has a boiling of no more than or less than 120, 110, 100, 90, 80, 70, 60, or 50° C. The solution or emulsion may be maintained at any suitable temperature (e.g., as provided above for melting and boiling points, or range therein).

The sizing agent can be included in the solvent carrier in any desired concentration, but typically in an amount no more than about 30% by weight of the total of sizing agent and solvent carrier, such as 0.01%, 0.05%, 0.1%, 0.2%, 0.5%, 1%, 2%, 5%, 10%, 15%, 20%, or 25% by weight, or a weight within a range bounded by any two of the foregoing values. The above-described process is particularly advantageous for the reason that it permits the sizing agent to be selectively adjusted in thickness and viscosity by appropriate adjustment in conditions used in the process. The sizing agent can be selectively adjusted in thickness by corresponding adjustment in the concentration of the sizing agent in the solution or emulsion of sizing agent, i.e., lower concentrations generally result in thinner layers of sizing agent and higher concentrations generally result in thicker layers of sizing agent. The sizing agent can be selectively adjusted in viscosity including a curing agent, and by corresponding adjustment in the amount of curing agent used, i.e., lower amounts of curing agents generally result in lower viscosities, and higher amounts of curing agents generally result in higher viscosities.

After the solution or emulsion described above is coated onto the continuous carbon fiber, the solvent is substantially or completely removed. In one embodiment, the coated carbon fiber is subjected to gas (typically air) drying at room temperature (e.g., from 15-25° C., or about 20° C.). The gas drying may be practiced under static gas or flowing gas conditions. If a gas other than air is used, the gas may be, for example, an inert gas, such as nitrogen or argon. In other embodiments, an elevated temperature may be used to facilitate removal of the solvent. Where an elevated temperature is used, the coated carbon fiber is heated to sufficient temperature to evaporate the solvent. By virtue of the drying process, the sizing agent (and nanoparticles embedded therein) becomes bonded to the surface of the carbon fiber. The sizing agent becomes bonded to the carbon fiber by any of the known bonding mechanisms, e.g., covalent, hydrogen, ionic, and/or physisorption bonding. The carbon fiber is subjected to a temperature below the decomposition temperature of the sizing agent and nanoparticles. In different embodiments, depending on the solvent and sizing agent, the drying temperature may be, for example, 150, 140, 130, 120, 110, 100, 90, 80, 70, 60, or 50° C., or a temperature within a range therein. To further facilitate solvent removal, a vacuum may be applied to the coated carbon fiber.

Following the above drying step, the coated carbon fiber may, in some embodiments, be subjected to a subsequent continuous feed-through process. For example, the sizing agent on the coated carbon fiber may be reacted with a crosslinking (curing) agent, such as described above, by dip coating, spraying, or brushing the coated carbon fiber with a solution or emulsion containing a crosslinking agent. The carbon fiber is typically again dried after the crosslinking step. In other embodiments, a second coating of the same or different sizing agent is applied onto the carbon fiber. For example, in some embodiments, one of the di-, tri-, tetra-, or higher glycidylated materials described above is used as a primer to coat (and bond with) the carbon fiber, and a second (i.e., overlayer) of di-, tri-, tetra-, or higher glycidylated material is coated onto the primer. In some embodiments, ethylene glycol diglycidyl ether is applied as a primer onto the carbon fiber surface, a thermal treatment is applied, followed by an overlayer of a different glycidylated material, such as bisphenol A diglycidyl ether.

In some embodiments, before the carbon fiber has been coated with a sizing agent, the carbon fiber is subjected to a process that functionalizes the carbon fiber surface with reactive groups that can form covalent, hydrogen, or ionic bonds with the sizing agent. For example, the carbon fibers may be subjected to a process in which hydroxyl (OH), carboxyl (COOH), and/or amino (e.g., $NH_2$) groups functionalize the surface of the carbon fiber. Carbon fibers can be surface-functionalized with such reactive groups by methods well known in the art, such as by an oxidative (e.g., plasma or chemical) surface treatment. Moreover, such surface-functionalized carbon fibers may be commercially available.

In another aspect, the invention is directed to a solid composite material in which the carbon fiber composite, as described above, is embedded (i.e., incorporated) within a polymeric matrix. The polymer of the matrix is typically a polymer suitable for use in a high strength application. The matrix polymer can be a thermoplastic or thermoset. Some particular matrix polymers considered herein are those resulting from vinyl-addition polymerization of an unsaturated precursor resin or unsaturated monomers. By being unsaturated, the precursor resin or monomer contains carbon-carbon double bonds. The polymeric matrix can be derived from, for example, curing any of the acrylate or methacrylate monomers known in the art (e.g., acrylic acid, methacrylic acid, methylmethacrylate, hydroxyethylmethacrylate), acrylonitrile, ethylene, propylene, styrene, divinylbenzene, 1,3-butadiene, cyclopentene, vinyl acetate, vinyl chloride, or a cycloolefin (e.g., cyclohexene, cycloheptene, cyclooctene, or norbornene), or a fluorinated unsaturated monomer, such as vinylidene fluoride, fluoroethylene, or tetrafluoroethylene, or a bromated unsaturated monomer (e.g., DGEBA-based vinyl ester monomer with bromo substitution on the aromatic ring). The polymeric matrix can be a homopolymer, or alternatively, a copolymer, e.g., block, random, alternating, or graft copolymer of two or more different types of monomers, such as any of those mentioned above.

The matrix polymer can also be any of the condensation polymers known in the art. The condensation polymer can be, for example, a polyester, polyamide, polyurethane, or phenol-formaldehyde, or a copolymer thereof, or a copolymer with any of the addition polymers described above. In some embodiments, the matrix polymer is a thermoplastic selected from polyether ether ketone (PEEK), polycarbonates, polymethacrylic acids, polyesters, polylactic acids, polyglycolic acids, thermoplastic polyurethanes, polymethacrylates, polymethylmethacrylates, Nylon 6, Nylon 6,6, polysulfones, polyvinylalcohols and polyimides.

In a first particular embodiment, the matrix polymer is derived from a vinyl ester resin by curing methods well-known in the art. Vinyl ester resins are known to possess terminal carbon-carbon double bonds. As known in the art, a vinyl ester resin is generally formed by reaction between a diepoxide, triepoxide, or higher polyepoxide (e.g., as described above under Formulas 1, 1a, and 2) and an unsaturated monocarboxylic acid, such as acrylic or methacrylic acid. The general process for producing an exemplary difunctional divinyl ester is provided as follows:

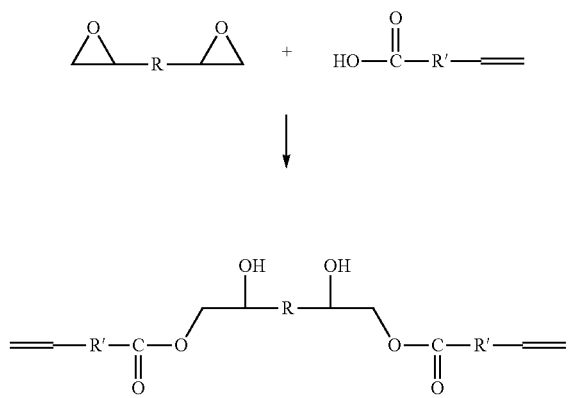

In the above scheme, an exemplary set of difunctional divinyl ester products are depicted in which R is as defined above and R' is either a bond or a hydrocarbon linker R, as defined above. In particular embodiments, the diepoxy molecule depicted in the above scheme is diglycidyl ether of bisphenol A (DGEBA).

In a second particular embodiment, the matrix polymer is derived from an unsaturated polyester resin. Unsaturated polyester resins are known to possess internal carbon-carbon double bonds. As known in the art, an unsaturated polyester resin is generally formed by reaction between a diol, triol, tetrol, or higher polyol, such as any of the polyols described above, and an unsaturated di- or tri-carboxylic acid, such as maleic, phthalic, isophthalic, or terephthalic acid. The general process for producing an exemplary unsaturated polyester resin is provided as follows:

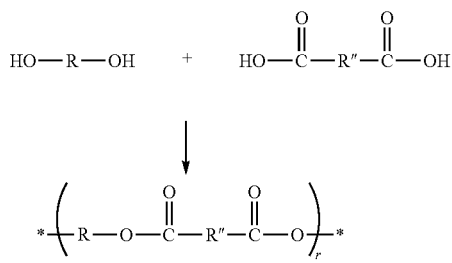

In the above scheme, an exemplary set of unsaturated polyester resin products are depicted in which R is as defined above and R" is an unsaturated hydrocarbon linker containing a reactive alkenyl group, such as any of the unsaturated hydrocarbon linkers defined for R above containing this feature, and r is generally at least 1, 2, 3, 4, or 5, and up to 6, 7, 8, 9, 10, 12, 15, 18, or 20 (or any range bounded by any two of these values). The diol HO—R—OH shown in the above scheme may be replaced with or combined with a triol, tetrol, or higher functional alcohol, or generically defined as $R-(OH)_n$ where n is as above except that it is a minimum of 2, and the dicarboxy molecule depicted in the above scheme can be replaced with or combined with a tricarboxy or higher carboxy molecule. In particular embodiments, the polyol is selected from a polyethylene glycol, such as ethylene glycol, diethylene glycol, and triethylene glycol, and the polycarboxy is selected from maleic acid, phthalic acid, isophthalic acid, and terephthalic acid.

In another aspect, the invention is directed to a process for preparing the composite described above in which the coated carbon fibers are embedded in a polymer matrix. In the method, carbon fibers coated with the sizing agent and nanoparticles are mixed with a matrix precursor resin before subjecting the mixture to a curing process. The matrix precursor resin can be any of the precursor resins described above, e.g., an unsaturated precursor resin, such as a vinyl ester resin or unsaturated polyester resin.

The conditions used in curing such precursor resins are well known in the art, and may rely on, for example, an elevated temperature, radiative exposure (e.g., UV, microwave, or electron beam), or both, as well as the use of an initiator, such as a peroxide (e.g., cumene hydroperoxide, butanone peroxide, t-butylperoxybenzoate, benzoyl peroxide, or MEKP) or Lewis acid (e.g., $BF_3$), and if applicable, a catalyst, such as a metal-containing catalyst, e.g., a ROMP catalyst. In particular embodiments, the curing step is conducted at a temperature selected from 100° C., 105° C., 110° C., 115° C., 120° C., 125° C., 130° C., 135° C., 140° C., 145° C., 150° C., 155° C., 160° C., 165° C., 170° C., 175° C., 180° C., or 185° C., or a temperature within a range bounded by any two of these values, for a curing time selected from, for example, 0.5, 1.0, 1.5, 2.0, 2.5, 3.0, 3.5, 4.0, 4.5, 5, 6, 7, or 8 hours, or a time within a range bounded by any two of these values, wherein it is understood that higher curing temperatures generally require shorter curing times to achieve the same effect. In some embodiments, a two-step or three-step curing process is used, wherein each step employs a different temperature. Moreover, the cure can be conducted at room temperature with the help of a promoter included in the resin, such as cobalt naphthenate, cobalt octoate, or cobalt acetylacetonate, and can be accelerated by the use of a catalyst, such as N,N-dimethylaniline and similar molecules.

Examples have been set forth below for the purpose of illustration and to describe certain specific embodiments of the invention. However, the scope of this invention is not to be in any way limited by the examples set forth herein.

EXAMPLES

Nanoparticle Deposition

Silicon carbide (SiC) nanoparticles (NPs) having a diameter of ca. 45-65 nm were used. The NPs were supplier-certified as 90% beta phase and 10% amorphous. A commercial epoxy sizing known as Hydrosize® EP876 was used. Deionized water was added to the EP876 formulation and mechanically stirred for 15 minutes at room temperature to produce a dip-coating bath. Two different epoxy dilutions were used, 1:10 and 1:40 by weight of epoxy mixture to water. The epoxy was received as a water mixture already, so the weight of that mixture was used in calculating the amount of water to add. When adding the SiC NPs into the dip-coating bath, the weight fraction was calculated from the weight of the dehydrated epoxy. SiC NP concentrations ranged from 0 wt. % to 50 wt. % in 10 wt. % increments. With the specified amount of SiC NPs weighed out, it was slowly added to the stirring diluted epoxy. As an example, to prepare a 1:10 dilution with 40 wt. % SiC NPs, 8.0 g of the EP876 epoxy was combined with 80 g of DI water and 0.31 g of SiC NPs. The mixture was left to stir for 24 hours and sonicated for approximately 30 minutes after about 1 hour of stirring at room temperature. This stirring resulted in no agglomerations of NPs that were visibly observable. This mixture was then added to the dip-coating bath and was continuously mechanically stirred during fiber application process. After dip coating, the fibers were coated with approximately 0.5 wt % to 3.5 wt % epoxy sizing as a function of total fiber weight.

The carbon fiber used in this research was commercially-available Hexcel HexTow® IM7. It was supplied as an unsized, 12 k tow (containing 12,000 individual carbon fibers) that was surface treated to improve compatibility with the epoxy sizing. This tow was fed at a rate of approximately 40 meters per hour through the dip-coating bath and dried in air at approximately 120 OC for 1 minute before being spooled on a fiber creel to await composite fabrication. The visual observation of the coating was performed using a Hitachi® S4800 scanning electron microscope operated at 10 kV and 10 pA.

Composite Fabrication

The compression mold for these unidirectional composites had a fixed final volume. Based on this final composite volume, the proper volume of fiber tows was added to the mold with excess amounts of epoxy. The epoxy matrix was a 100:26.4 ratio by weight of Epon™ 862 and Epikure™ Curing Agent W (both of Hexion, Inc.). Under compression, the excess epoxy could flow from the mold, and the high viscosity nature of the epoxy permitted the proper amount of epoxy to remain in the mold during the curing process. The epoxy was cured at 121° C. for 4 hours, according to manufacturer specifications. Two different thicknesses of composites were fabricated, with the fiber volume fraction staying constant. The thicker composites were used for the short beam shear tests and were 2.85 mm thick with a width of 12.6 mm and a length of 125 mm. Thinner composites were fabricated for the SHM and dynamic mechanical analyzer (DMA) tests. The width and length remained constant, but the thickness was decreased to 1 mm. The reduced thickness permitted an increased DMA strain amplitude of the composite beams during SHM characterization. Fiber loading was calculated to achieve a 60 vol % fiber content. This equated to using 85 tows for the thicker samples and 33 tows for the thinner samples, which was based on the fiber diameter of 5.2 µm and the tow containing 12,000 fibers.

Structural Health Monitoring Characterization

A single cantilever clamp in a DMA was used to strain the composite beams. The beams were sectioned and polished to a thickness, width and length of 1 mm, 12.5 mm and 60 mm, respectively. An out-of-plane through-thickness electroding configuration was established by adhering wires to the composite's surface using silver paint. The electrodes were placed 12.5 mm apart and were centered between the two DMA clamps. A digital multimeter was used in conjunction with commercial software to record the electrical resistance data. The DMA testing used a custom displacement-controlled method that induced a specified displacement to each composite. The displacement rate was 3000 µm/min to the specified displacement level, then held at that displacement for roughly 10 seconds. The DMA then returned the composite beam to zero displacement at a rate of 3000 µm/min and held for another 10 seconds before displacing again. This procedure was repeated at least 10 times at different strain levels.

Fourier Transform Infrared Spectroscopy

Fourier transform infrared spectroscopy (FTIR) measurements were performed on a commercial instrument using the attenuated total reflectance method. The spectra were measured from 500 $cm^{-1}$ to 4000 $cm^{-1}$ using a scan speed of 1 $cm·s^{-1}$ and a resolution of 4 $cm^{-1}$ with the baseline being subtracted for correction.

Mechanical Characterization

Interlaminar shear strength (ILSS) tests were performed on a commercial tensile frame according to ASTM D2344 with the samples sectioned and polished to the approximate dimensions of 2.6 mm by 6 mm by 18 mm. The dimensions for each individual sample were measured before each test to attain accurate strength results. The span length was adjusted for each sample set based on the sample thickness and in accordance to ASTM D2344. The crosshead speed was 1 mm/min. These tests were performed on at least 10 samples for each composite composition.

The DMA was used to characterize the viscoelastic properties of the composites as a function of temperature. The composite beams were cut to approximate dimensions of 1 mm, 12.5 mm and 35 mm for thickness, width, and length, respectively. Using a three-point bend configuration, the DMA was operated with an oscillating 10 Hz sinusoidal waveform with a strain amplitude of 0.01% and was ramped from room temperature to 250° C. at a rate of 2° C./min.

Thermal Analysis

A commercial thermogravimetric analyzer (TGA) was used to gather the thermal degradation characteristics of the fibers. Platinum pans were used with roughly 3-5 mg of fibers for each test. A high-resolution mode with dynamic temperature ramp rate was used to capture the fiber's degradation properties. The test ran from room temperature to 850° C. at 50° C./min in air. As a result of the mode used for these tests, the ramp rate would decrease when large weight changes were detected in order to more precisely identify transition temperatures. Air was used instead of nitrogen in order to burn off every component in the sample except for the SiC NPs. This permitted the determination of the epoxy and SiC content relative to the entire fiber weight.

Results and Discussion

A straight-forward integration procedure was used to adhere SiC NPs to the carbon fiber surface via a continuous feed-through sizing process. As illustrated in FIG. 1, a commercial epoxy sizing was obtained and diluted with deionized (DI) water to decrease the fiber coating thickness. The epoxy was supplied as an aqueous dispersion so increasing the water content did not adversely affect the epoxy chemistry. As shown in the following sections, the aqueous epoxy solution was diluted at two concentrations, 1:10 and 1:40 of epoxy to water calculated by weight. The dilution not only helped with varying the sizing thickness but also demonstrated the versatility of this technique to accommodate different sizing viscosities and NP concentrations. After dilution, SiC NPs were weighed out as a percentage of the dehydrated epoxy and added directly to the aqueous epoxy solution. This mixture was stirred and sonicated until well dispersed.

The NP concentration ranged from 0 to 50 wt. % in 10 wt. % intervals for both epoxy dilutions. This weight fraction takes into account only the dehydrated epoxy and the NPs, so this is a minuscule NP concentration when compared to the overall fiber weight. In fact, even at the highest SiC concentration tested in these experiments, the SiC NP concentration is less than 3 wt. % of the entire weight of the fiber. This epoxy mixture was then added to the fiber surface through a simple dip coating procedure where the carbon fiber tow was submerged in the liquid and then removed and dried at about 120° C. in air. Upon drying, the tow was collected on a spool to await composite fabrication. This was all performed in a continuous feed-through process that successfully maintained ease of fiber handling in the subsequent composite fabrication steps despite the inclusion of NPs on the fiber surface. The coated fibers were then used to make unidirectional fiber reinforced composites with 60 vol. % fibers via compression molding using an epoxy matrix material. This resulted in 12 different composite compositions that were sectioned with various dimensions for SHM, mechanical and viscoelastic property characterization.

Structural Health Monitoring

The SiC NPs were initially considered for enhancing the composite's SHM capabilities. The inherent piezoresistive attribute of SiC was utilized to enhance the change in electrical resistance of the composite under varying external stresses. Due to the use of the piezoresistive effect instead of the piezoelectric effect, static loading conditions could be utilized as opposed to dynamic loads. Piezoelectric materials have been used for SHM in the literature but they require dynamic loading cycles in order to generate a signal so they cannot be used for static loading scenarios (e.g., C. C. Bowland et al., *ACS Appl. Mater. Interfaces*, 9, 4057, 2017, and M. H. Malakooti et al., *Energy Environ. Sci.*, 9, 634, 2016). This permits piezoresistive SHM sensors to be employed in different real-world sensing applications than piezoelectric sensors. One condition for utilizing this piezoresistive type SHM is that the bulk material must have sufficiently low electrical resistance. This criterion makes carbon fiber a perfect candidate due to its electrically conductive property that directly translates to an electrically conductive composite.

Figure 2A:
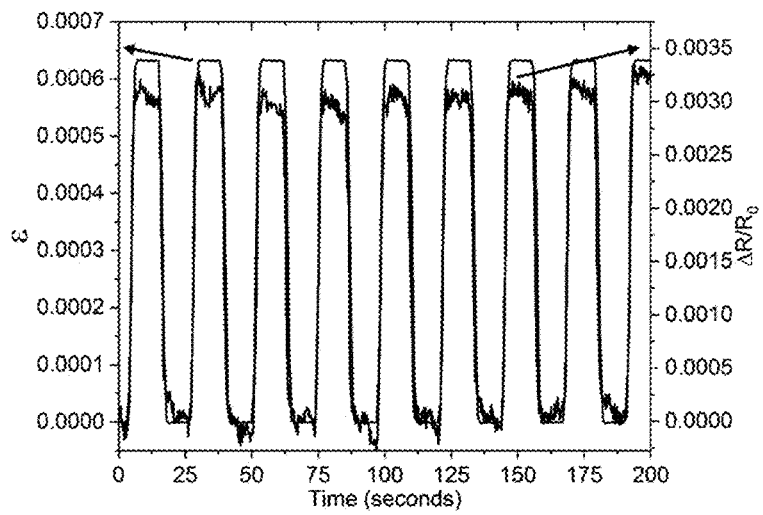
FIG. 2A is a graph showing typical electrical resistance response to repeated input strain.
Figure 2B:
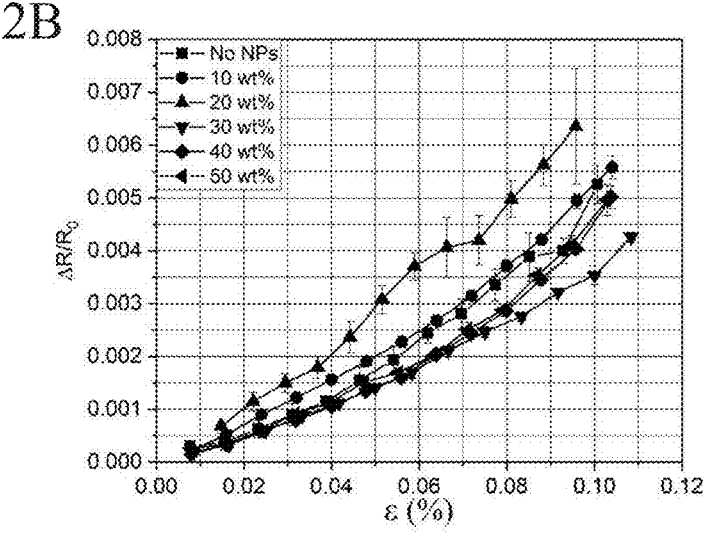
FIGS. 2B and 2C are plots of the average relative resistance change as a function of input strain for carbon fibers coated with various SiC NP concentrations in a 1:10 epoxy:water solution (FIG. 2B) and 1:40 epoxy:water solution (FIG. 2C).
Figure 2C:
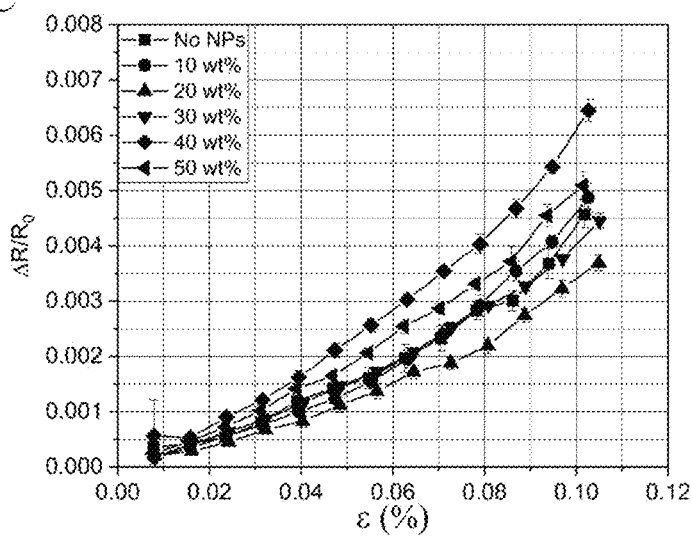

To characterize this SHM capability, the unidirectional composites were sectioned into cantilevers and devised electrodes to measure the out-of-plane through-thickness electrical resistance. These composites were placed in a dynamic mechanical analyzer (DMA) in a single cantilever configuration to apply repeated cycles of static strains at various magnitudes. Monitoring the out-of-plane through-thickness electrical resistance revealed clear changes in resistance as a function of applied stress. Typical strain cycles and relative electrical resistance changes are shown in FIG. 2A. These loading cycles were used to calculate an average relative resistance change as a function of the strain. FIGS. 2B and 2C are plots of the average relative resistance change as a function of input strain for carbon fibers coated with various SiC NP concentrations in the 1:10 epoxy:water solution (FIG. 2B) and 1:40 epoxy:water solution (FIG. 2C). For each strain value, the relative resistance change was averaged over at least 10 strain cycles, and this was repeated for at least 10 different strain levels. These 100 strain cycles were completed for all 12 composites with varying concentrations of NPs with the 1:10 and 1:40 epoxy dilutions plotted in FIGS. 2B and 2C, respectively.

For the 1:10 epoxy dilution fibers (FIG. 2B), the average electrical resistance change increased significantly at a concentration of 20 wt. % (in 1:10 epoxy dilution) SiC NPs. The other concentrations either stayed roughly the same as the epoxy only case or experienced a slight decrease in electrical response magnitude. A similar trend was observed for the 1:40 epoxy dilution composites in FIG. 2C. For these composites, the maximum increase in SHM sensitivity was observed in the 40 wt. % SiC NPs. This showed that the peak performance level shifted to a higher SiC NP concentration when the dilution ratio increased. The weight fraction of epoxy on the fiber was observed to decrease as the epoxy dilution increased from 1:10 to 1:40. This repeated trend for both dilution levels confirmed that there is an optimum SiC NP concentration. Depending on the fiber sizing concentration, the optimum NP concentration will vary, at least for the case of the SiC NPs in this research using the described application technique.

While the above findings were not the expected result, this still illustrates that SiC NPs at the appropriate concentrations can bring about significant enhancements in the SHMV capabilities of carbon fiber composites. This trend did not match with the original hypothesis that increasing the SiC concentration would further enhance the sensing sensitivity. The optimum level of SiC is attributed to NP agglomerations forming on the fibers instead of strictly percolation effects. When mixing the NPs in solution, the NPs could agglomerate and settle out of the solution at higher concentrations or these agglomerations could end up on the fibers. This agglomeration effect is further discussed in the following sections regarding the composite's mechanical performance.

Figure 2D:
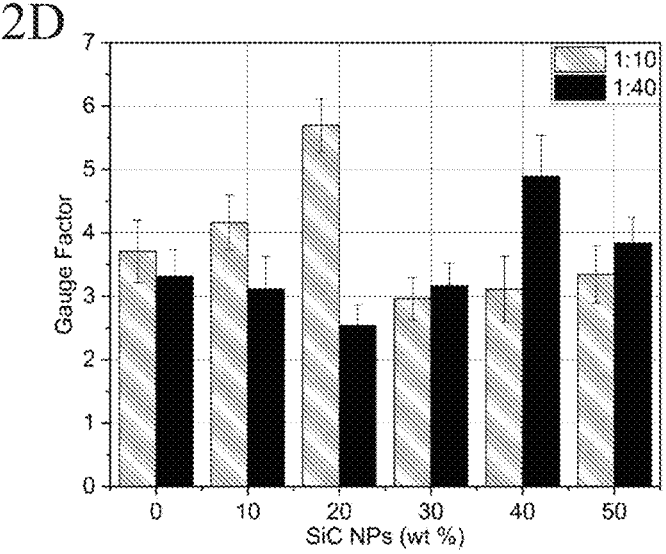
FIG. 2D is a bar chart showing the average gauge factor, a measure of average relative resistance change per unit applied strain, for the composite over the entire strain range tested. Error bars were calculated as a 95% confidence interval.

The two relative resistance change versus strain plots (FIGS. 2B and 2C) showed a general trend in the data, but a more quantified method was used to effectively summarize the results. The typical way of characterizing sensor sensitivity is to calculate the gauge factor, which takes the relative resistance change and divides it by the applied strain as shown in the following equation:

$$\text{Gauge Factor} = \frac{\frac{\Delta R}{R_0}}{\varepsilon}$$

where $\Delta R$ is the change in resistance, $R_0$ is the initial resistance and e is the strain. Following the above equation, the overall average gauge factor for each composite was calculated. The gauge factor at each strain value was calculated using the above equation and then all of the gauge factors over the entire strain range (0.01%-0.12%) were averaged, thus resulting in a single gauge factor value for each composite. This helped to compare the sensitivity of each composite, with the results plotted in FIG. 2D. FIG. 2D is a bar chart showing the average gauge factor for composite over the entire strain range tested. Overall, the maximum gauge factors for the composites were 6.12 for the 1:10 epoxy dilution with 20 wt. % SiC NPs and 5.33 for the 1:40 epoxy dilution with 40 wt. % SiC NPs. For comparison, in the literature, fiber sensors have been fabricated using CNTs and revealed a gauge factor of 1.6, which is similar to a gauge factor of about 2 for foil strain gauges, while SiC itself has shown a gauge factor of 25 to 28 (e.g., H.-P. Phan et al., *Sci. Rep.* 6, 28499, 2016 and G. J. Ehlert et al., *J. Intell. Mater. Syst. Struct.*, 25, 2117, 2014). When compared to the composites with no NPs, this equated to a maximum SHM sensitivity improvement of 54% and 48% for the 1:10 and 1:40 epoxy dilutions, respectively. Ultimately, this showed that SiC NPs embedded in the epoxy sizing and coated on carbon fiber can significantly enhance the SHM sensitivity of the composites.

Mechanical Performance

To be classified as a truly multifunctional composite, the composite must maintain its structural integrity while having added functionalities. Ideally, both the mechanical performance and functional properties of the composite will be enhanced. Since increases in the functional properties were shown in the previous section, the composite's mechanical performance was investigated to show that the NPs created a truly multifunctional structural composite.

Short Beam Strength

Figure 3A:
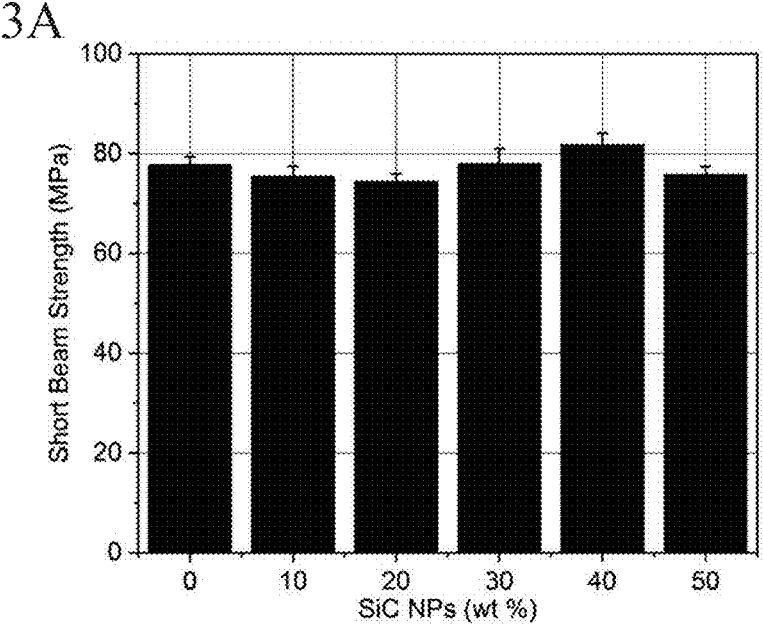
FIGS. 3A and 3B show the short beam strength results vs. wt % of SiC NPs suspended in (a) concentrated sizing emulsion having 1:10 epoxy:water (FIG. 3A) and (b) the diluted emulsion having 1:40 epoxy:water (FIG. 3B) for coating the carbon fibers with. Error bars are shown as a 95% confidence interval.
Figure 3B:
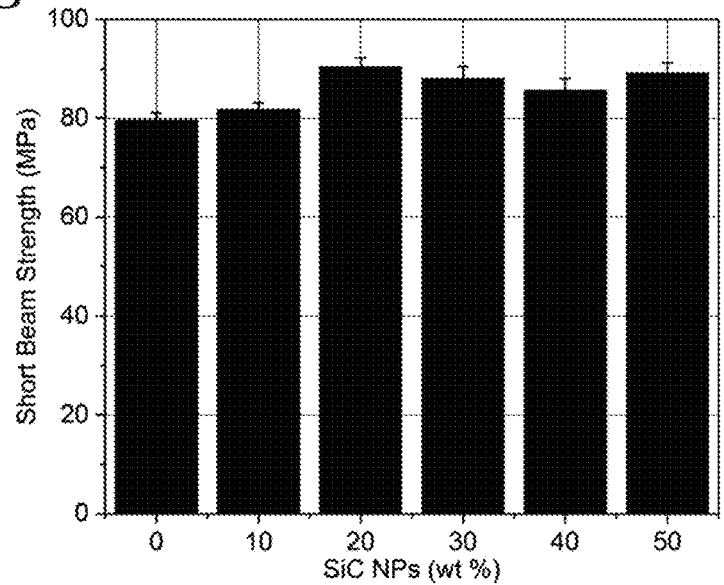

An important property of fiber reinforced composites is the interlaminar strength. While the fibers are very strong under tensile loads parallel to the fiber axis, composite weaknesses come from the fiber-to-matrix adhesion, thus illustrating the need to characterize the interlaminar strength through short beam shear tests. This test uses a three-point bend configuration with a short span length to determine the composite's interlaminar strength. FIGS. 3A and 3B show the results of these tests for the 1:10 and 1:40 epoxy dilution composites, respectively. It is seen that for the 1:10 epoxy dilution (FIG. 3A) three composites experienced slight decreases in strength, but these decreases were at most a 4.4% drop in strength. More importantly, the 40 wt. % NP composite actually saw a 5.1% increase in short beam strength while the 30 wt. % NP composite retained its mechanical strength. The 1:40 epoxy dilution composites revealed even more profound strength enhancements. In fact, all of the 1:40 composites (FIG. 3B) showed increases in short beam strength, with the highest increase being 13.7% for the 20 wt. % NP composite.

These interlaminar strength enhancements were surprising due to the lack of chemical interaction expected between the NPs and the fiber and the matrix. As a result of the NPs not having any surface functional groups, the variations in the mechanical performance can be attributed to physical contributions, specifically mechanical interlocking. Mechanical interlocking has been explored for carbon fiber through etching to increase surface roughness, but these processes are too time-intensive and costly for large-scale production processes and can degrade the tensile strength of the fibers (W. Song et al., *Appl. Surf Sci.*, 257, 4069, 2011). As observed in the previous section, higher concentrations of NPs in the sizing mixture caused some agglomeration of the NPs. While these could serve as stress concentration sites for cracks to form, the literature has indicated mechanical benefits of having this type of NP clustering in nanocomposites by creating a pinning mechanism (e.g., L. Sun et al., *Compos. Sci. Technol.*, 69, 2392, 2009). This mechanism can change the crack propagation direction and lead to increased fracture strength. Therefore, agglomerations were detrimental to the SHM sensitivity, yet they proved to be beneficial for mechanical strength.

Figures 4A, 4B:
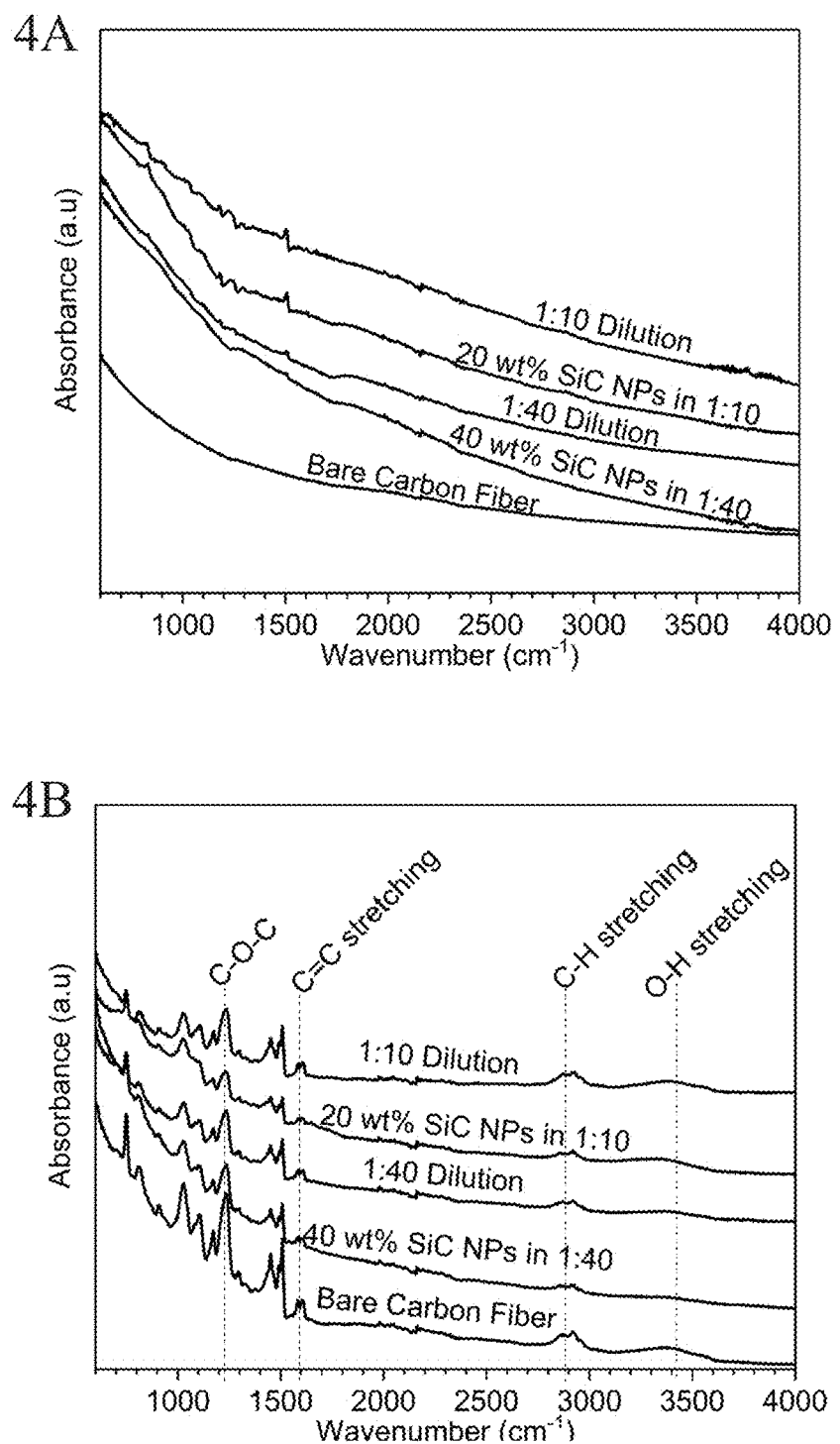
FIGS. 4A and 4B show FTIR spectra for carbon fibers with different sizing compositions, before embedding the fibers in an epoxy matrix (FIG. 4A) and after composite fabrication in which the fibers are embedded in an epoxy matrix (FIG. 4B).

This mechanical interlocking effect was validated by confirming that no additional chemical interactions were present in the composites after SiC addition. The chemical bonds present on the fibers and in the composites were identified via Fourier-transform infrared spectroscopy (FTIR). FIG. 4A shows the spectra for fiber tows before and after epoxy sizing treatments, while FIG. 4B shows the same fiber tows after being embedded in the epoxy matrix to form the final composite. The fibers selected for this analysis were the as-received bare carbon fiber, the epoxy-only fibers for both dilutions, the 20 wt. % in the 1:10 dilution, and the 40 wt. % in the 1:40 dilution. These fibers were sufficient to provide a representative sampling of the entire fiber set.

There appears to be no appreciable difference between the fibers with and without the embedded SiC NPs. As compared to the bare carbon fiber, the coated fibers show slight epoxy peaks from the sizing. These peaks were low intensity due to the low volume of sizing on the fibers, but they are slightly more intense in the 1:10 epoxy dilution fibers resulting from the increased sizing thickness. The epoxy peaks are much more prevalent in FIG. 4B due to the large increase in epoxy volume. Although the presence of particles on the sized CF tow was confirmed by TGA and electron microscopy analysis, no additional chemical bonding was observed from integrating the SiC NPs, thus supporting the hypothesis that the increase in mechanical performance is due to mechanical interlocking and not chemical interactions. Therefore, the results presented here offer a simple and straight-forward route to introduce mechanical interlocking to increase the interlaminar strength of carbon fiber reinforced composites via NP-embedded sizing.

Damping

In addition to interlaminar strength enhancements, the viscoelastic properties of the composites showed large variations resulting from SiC NP integration. These viscoelastic properties were investigated via DMA testing using a three-point bend configuration. This is a common test to measure the storage modulus and loss modulus of polymers and composites. The storage modulus provides information regarding the elastic behavior of the material while the loss modulus is a measure of the viscous properties. Thus, this test provides the viscoelastic properties of a material. Determining those two moduli, a third value known as the damping loss factor or loss tangent (tan $\delta$) can be calculated by dividing the loss modulus by the storage modulus. This value provides the energy dissipation capability of a material. A higher tan $\delta$ value represents higher damping abilities, which means the material can absorb more energy at the broad relaxation temperature (100-150° C.). Higher damping is a sought-after material characteristic in automobiles and aircraft for vibration control and fatigue mitigation (L. Sun et al., supra). Consequently, this research concentrated on comparing the tan $\delta$ of the composites with the aim of increasing that value.

Figures 5A, 5B, 5C:
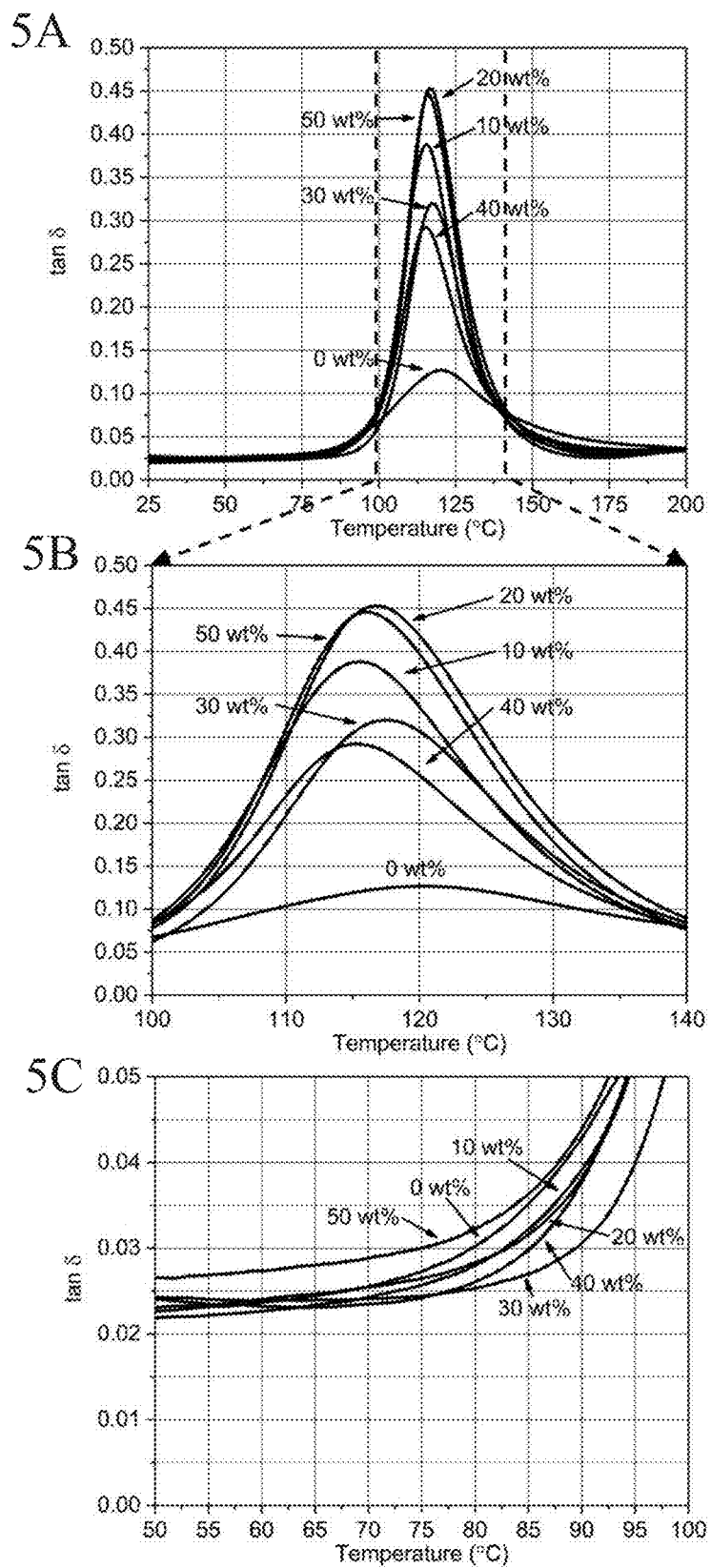
FIGS. 5A-5F show damping loss factor (tan δ) plots for carbon fibers coated with different SiC concentrations and two different epoxy dilutions.
Figures 5D, 5E, 5F:
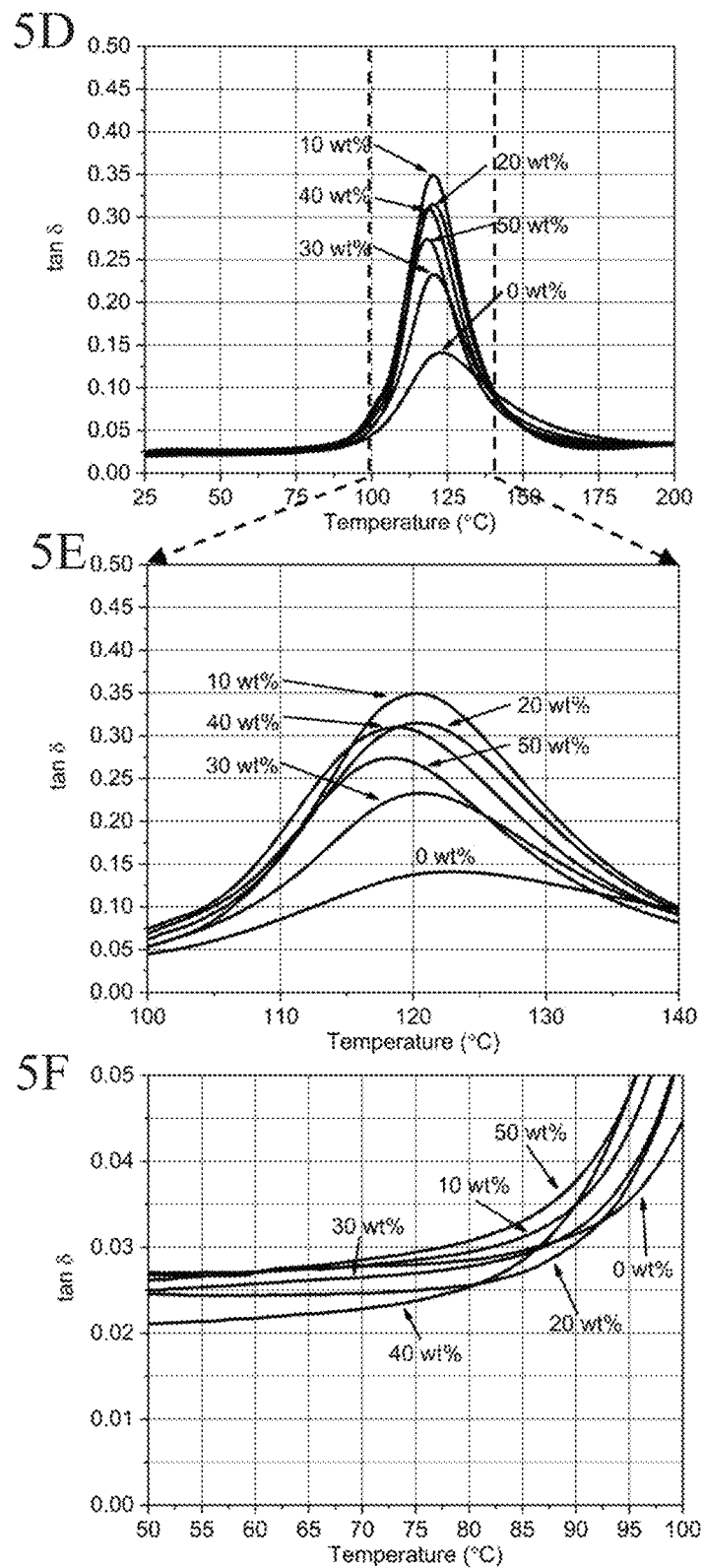

The composite beams were subjected to a 10 Hz sinusoidal input waveform with a strain amplitude of 0.01% and heated from room temperature to 250° C. at a rate of 2° C./min. The resulting tan $\delta$ plots for the 12 different composites are shown in FIGS. 5A-5F. FIGS. 5A-5C show results for carbon fibers coated with 1:10 epoxy:water solution. FIGS. 5D-5F show results for carbon fibers coated with 1:40 epoxy:water solution. More specifically, FIG. 5A shows the full temperature range of the 1:10 solution with magnified view at the glass transition temperature (FIG. 5B) and before the glass transition temperature (FIG. 5C). Similarly, FIG. 5D shows the full temperature range of the 1:40 solution with magnified view at the glass transition temperature (FIG. 5E) and before the glass transition temperature (FIG. 5F). Around the glass transition temperature, a clear peak in tan δ is experienced as expected for a polymer as it transitions from the glassy state to a rubbery state. Results showed increased damping at the glass transition temperature for the NP integrated composites. Both the 1:10 and 1:40 dilution composites showed significant increases in the tan δ at the glass transition, as shown in FIGS. 5B and 5E. For the 1:10 composites (FIGS. 5A and 5B), the peak tan δ value was 0.13 for the composite with no NPs. Comparing that sample to the composites with NPs, there was a minimum increase of 130% in tan δ to ca. 0.29 and a maximum increase of 257% in tan δ to ca. 0.45 for the 40 wt. % and 20 wt. % NP composites, respectively. The 1:40 composites (FIGS. 5D and 5E) experienced significant increases in the peak tan δ as well. Without NPs, the tan δ was ca. 0.14. With NP integration, the minimum tan δ increase was 65% to ca. 0.23, and the maximum increase was 147% to a value of ca. 0.35 for the 30 wt. % and 10 wt. % composites, respectively.

Despite there being no clear correlation between tan δ and NP concentration, each composite with NPs experienced a significant increase in the peak tan δ over the composite without NPs. While the peak tan δ showed significant increases for all composites with NPs, the tan δ changes before the onset of the glass transition were not as drastic. The 1:10 composites (FIG. 5C) showed an initial tan δ of ca. 0.023 with no NPs but decreased slightly to ca. 0.022 with 10 wt. % NPs. With additional NPs, the tan δ increased modestly to a maximum of ca. 0.027 for the 50 wt. % NPs, which equates to a 17.0% increase. However, the 1:40 composites (FIG. 5F) experienced an opposite trend in tan δ value before the glass transition temperature. For the composite with no NPs, the tan δ was ca. 0.027. This initially remained unchanged with the addition of 10 wt. % NPs. With additional NPs, the tan δ decreased to a minimum value of ca. 0.021 for the 40 wt. % NP composite. This equates to a 21% decrease in tan δ as compared to the composite with no NPs. Therefore, before the glass transition temperature, the different epoxy dilutions had experienced differing changes in the tan δ. However, at the glass transition temperature, the NP content generated profound increases in the tan δ for both epoxy dilutions.

These dramatic changes in the tan δ at the glass transition temperature are attributed to mechanical rather than chemical contributions, which agrees with the previous sections. Just as the fibers will create an interphase region with the matrix, the NPs themselves are surrounded by an interphase layer due to polymer-chain immobilization, which can contribute to the energy absorption ability of the composite. When elevating the temperature of the composite through its glass transition temperature, an increase in tan δ beyond that of just the polymer will occur with the onset of slippage between the NPs and the polymer matrix when no covalent bonding is present between the NP and polymer (J. Suhr et al., *Nat. Mater.*, 4, 134, 2005 and J. Suhr et al., *J. Mater. Sci.*, 43, 4370, 2008. Using tan δ as the curve for determining the glass transition temperature, the transition temperature was not significantly affected by the NPs at these loading concentrations, thus also confirming the lack of chemical bonding between the NPs and polymer. This explains the significant increases in tan δ at the glass transition temperature for the composites with NPs.

Conclusions

Here, it was demonstrated that through a facile fiber coating process, nanomaterials could be adhered to the fiber's surface and enhance the bulk composite's properties. Using SiC NPs resulted in enhanced SHM capabilities with a maximum of 54% increase in sensitivity. There were also mechanical performance enhancements seen in a maximum 13.7% increase in interlaminar strength. Ideally, a multifunctional composite will have both increased mechanical strength and enhanced functional properties. There is typically a trade-off between these properties when additional elements get added to the composite system. By looking at the short beam strength in conjunction with the average gauge factor, it turns out that two composites increased both in strength and SHM sensitivity. These composites were both fabricated using the 1:40 epoxy dilution composites. The 1:10 dilution composites experienced trade-offs between interlaminar strength and SHM sensitivity. The 40 wt. % SiC in 1:40 dilution composite experienced a 47.5% increase in gauge factor and a 7.7% increase in short beam strength. The 50 wt. % SiC in 1:40 dilution composite revealed a 15.8% increase in gauge factor and a 12.2% increase in short beam strength. Therefore, based on the SHM gauge factor calculation and the interlaminar strength, the 1:40 epoxy dilution out-performed the 1:10 epoxy dilution and resulted in a truly multifunctional composite with no trade-off between mechanical and functional performance metrics.

These NPs also significantly altered the composite damping properties as shown in the tan δ values obtained by DMA testing. At the glass transition temperature, all SiC concentrations showed substantial increases in tan δ, which ranged from a 65% to 257% increase. By showing that no significant amount of new chemical bonds were formed resulting from the SiC NPs, the mechanical property modifications were attributed to mechanical interlocking and slippage between the matrix and the NPs. These results show that simple integration of low weight fractions of ceramic NPs in the fiber sizing can have profound effects on various properties of the bulk composite. Most importantly, the short beam strength and SHM sensitivity were enhanced simultaneously by using SiC NPs thus demonstrating a truly multifunctional composite using an easily commercializable process that is economically viable using current commercially-available nanomaterials. Furthermore, this methodology is versatile in that it applies to not only carbon fibers nor only SiC NPs, but can be applied to various fibers and NP combinations.

While there have been shown and described what are at present considered the preferred embodiments of the invention, those skilled in the art may make various changes and modifications which remain within the scope of the invention defined by the appended claims.

What is claimed is:

1. A carbon fiber composite material comprising:
   (i) a carbon fiber having an outer surface, a thickness of at least 1 micron, and a length-to-width aspect ratio of at least 1000;
   (ii) a sizing agent coated on the outer surface of said carbon fiber; and
   (iii) piezoresistive nanoparticles embedded within said sizing agent, wherein said piezoresistive nanoparticles have a composition selected from the group consisting of metal carbides, metal nitrides, and metal borides.

2. The carbon fiber composite material of claim 1, wherein said carbon fiber is a continuous carbon fiber having a length of at least 1 meter.

3. The carbon fiber composite material of claim 1, wherein said carbon fiber is a chopped segment of a continuous carbon fiber, wherein said chopped segment has a length of 0.1-10 cm.

4. The carbon fiber composite material of claim 1, wherein said piezoresistive nanoparticles have a metal carbide composition.

5. The carbon fiber composite material of claim 4, wherein said metal carbide composition is a silicon carbide composition.

6. The carbon fiber composite material of claim 1, wherein said piezoresistive nanoparticles are present in an amount of 0.01-20 wt % by weight of the carbon fiber composite.

7. The carbon fiber composite material of claim 1, wherein said piezoresistive nanoparticles are present in an amount of 0.01-10 wt % by weight of the carbon fiber composite.

8. The carbon fiber composite material of claim 1, wherein said sizing agent is an epoxy sizing agent.

9. The carbon fiber composite material of claim 1, wherein said sizing agent has a thickness of up to 200 nm.

10. The carbon fiber composite material of claim 1, wherein said piezoresistive nanoparticles have a size in at least one dimension of up to 100 nm.

11. A method for producing a carbon fiber composite material, the method comprising:
(a) continuously feeding and coating a continuous carbon fiber with a liquid solution or emulsion containing a solvent, a sizing agent, and piezoresistive nanoparticles in a continuous feed-through process to result in said sizing agent and piezoresistive nanoparticles coating the surface of the continuous carbon fiber, wherein said continuous carbon fiber has an outer surface, a thickness of at least 1 micron, and a length of at least 1 meter, and said piezoresistive nanoparticles have a composition selected from the group consisting of metal carbides, metal nitrides, and metal borides; and
(b) removing the solvent to result in said sizing agent and piezoresistive nanoparticles bonding to the outer surface of the continuous carbon fiber to produce a continuous carbon fiber composite;
wherein said continuous carbon fiber composite material comprises: (i) said continuous carbon fiber, (ii) said sizing agent coated on the outer surface of said continuous carbon fiber, and (iii) said piezoresistive nanoparticles embedded within said sizing agent.

12. The method of claim 11, wherein said piezoresistive nanoparticles have a metal carbide composition.

13. The method of claim 12, wherein said metal carbide composition is a silicon carbide composition.

14. The method of claim 11, wherein said piezoresistive nanoparticles are present in an amount of 0.01-20 wt % by weight of the carbon fiber composite.

15. The method of claim 11, wherein said piezoresistive nanoparticles are present in an amount of 0.01-10 wt % by weight of the carbon fiber composite.

16. The method of claim 11, wherein said sizing agent is an epoxy sizing agent.

17. The method of claim 11, wherein the continuous carbon fiber composite produced in step (b) is chopped into segments having a length of 0.1-10 cm.

18. The method of claim 11, wherein the continuous carbon fiber composite produced in step (b) is chopped into segments having a length of 0.1-1 cm.

19. The method of claim 11, wherein, in step (b), the solvent is removed by heating the coated fiber to facilitate evaporation of the solvent.

\* \* \* \* \*